(12) United States Patent
Agarwal et al.

(10) Patent No.: US 9,930,685 B2
(45) Date of Patent: Mar. 27, 2018

(54) TECHNIQUES FOR TRANSMITTING AND RECEIVING DELAYED FEEDBACK FOR A TRANSMISSION

(71) Applicant: QUALCOMM Incorporated, San Diego, CA (US)

(72) Inventors: Ravi Agarwal, San Diego, CA (US); Gavin Bernard Horn, La Jolla, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/345,085

(22) Filed: Nov. 7, 2016

(65) Prior Publication Data
US 2017/0325245 A1  Nov. 9, 2017

Related U.S. Application Data

(60) Provisional application No. 62/331,894, filed on May 4, 2016.

(51) Int. Cl.
*H04J 3/00* (2006.01)
*H04W 72/12* (2009.01)
(Continued)

(52) U.S. Cl.
CPC ............ *H04W 72/12* (2013.01); *H04B 1/401* (2013.01); *H04L 1/1854* (2013.01);
(Continued)

(58) Field of Classification Search
CPC ... H04L 1/1607; H04L 1/1854; H04L 1/1812; H04L 5/0055; H04L 5/0057
(Continued)

(56) References Cited

U.S. PATENT DOCUMENTS

2011/0310784 A1* 12/2011 Park ...................... H04L 1/1854
                                                        370/312
2012/0120821 A1*  5/2012 Kazmi ............... H04W 56/0005
                                                        370/252
(Continued)

OTHER PUBLICATIONS

ISA/EP, International Search Report and Written Opinion of the International Searching Authority, Int'l Application No. PCT/US2017/030189, dated Jul. 26, 2017, European Patent Office, Rijswijk, NL, 15 pgs.

*Primary Examiner* — Lee Nguyen

(74) *Attorney, Agent, or Firm* — Holland & Hart, LLP

(57) ABSTRACT

Techniques are described for wireless communication. One method includes receiving a first transmission according to a first radio access technology (RAT); determining a transmitter of the wireless communication device is tuned to a second RAT during a default feedback transmission time for the first transmission; and transmitting feedback for the first transmission at a delayed feedback transmission time for the first transmission. The delayed feedback transmission time is based at least in part on a timing for tuning the transmitter from the second RAT to the first RAT. Another method includes transmitting a first transmission, in which the first transmission is associated with a default feedback transmission time for the first transmission; and receiving feedback for the first transmission at a delayed feedback transmission time for the first transmission.

26 Claims, 14 Drawing Sheets

(51) Int. Cl.
   *H04B 1/401*     (2015.01)
   *H04L 1/18*      (2006.01)
   *H04L 5/00*      (2006.01)
   *H04W 88/06*     (2009.01)
   *H04B 7/212*     (2006.01)
   *H04L 1/16*      (2006.01)

(52) U.S. Cl.
   CPC .......... *H04L 1/1861* (2013.01); *H04L 5/0055* (2013.01); *H04W 88/06* (2013.01); *H04L 1/1664* (2013.01)

(58) Field of Classification Search
   USPC .......................................... 370/336; 714/748
   See application file for complete search history.

(56)            References Cited

U.S. PATENT DOCUMENTS

2015/0333890 A1   11/2015   Yang et al.
2015/0334740 A1   11/2015   Yang et al.

\* cited by examiner

TECHNIQUES FOR TRANSMITTING AND RECEIVING DELAYED FEEDBACK FOR A TRANSMISSION

CROSS REFERENCES

The present Application for Patent claims priority to U.S. Provisional Patent Application No. 62/331,894 by Agarwal, et al., entitled "Techniques For Transmitting And Receiving Delayed Feedback For A Transmission," filed May 4, 2016, assigned to the assignee hereof, and hereby expressly incorporated by reference herein in its entirety.

INTRODUCTION

The present disclosure, for example, relates to wireless communication systems, and more particularly to techniques for transmitting and receiving delayed feedback for a transmission.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

In some examples, a wireless multiple-access communication system may include a number of base stations, each simultaneously supporting communication for multiple communication devices, otherwise known as user equipment (UE). In a Long-Term Evolution (LTE) or LTE-Advanced (LTE-A) network, a set of one or more base stations may define an eNodeB (eNB). In other examples (e.g., in a next generation or 5G network), a wireless multiple access communication system may include a number of smart radio head (RH) in communication with a number of access node controller (ANC), where a set of one or more RHs, in communication with an ANC, defines an eNB. A base station or RH may communicate with a set of UEs on downlink (DL) channels (e.g., for transmissions from a base station or RH to a UE) and uplink (UL) channels (e.g., for transmissions from a UE to a base station or RH).

In some examples, a wireless communication device (e.g., a UE or network access device (e.g., an eNB, an ANC, an RH, or a base station)) may transmit or receive feedback for a transmission on an UL channel or DL channel.

SUMMARY

A method of wireless communication at a wireless communication devices is described. The method may include receiving a first transmission according to a first a first radio access technology (RAT); determining a transmitter of the wireless communication device is tuned to a second RAT during a default feedback transmission time for the first transmission; and transmitting feedback for the first transmission at a delayed feedback transmission time for the first transmission. In some examples, the delayed feedback transmission time may be based at least in part on a timing for tuning the transmitter from the second RAT to the first RAT.

An apparatus for wireless communication is described. The apparatus may include a processor, memory in electronic communication with the processor. The processor and memory may be configured to receive a first transmission according to a first RAT; determine a transmitter of the wireless communication device is tuned to a second RAT during a default feedback transmission time for the first transmission; and transmit feedback for the first transmission at a delayed feedback transmission time for the first transmission. In some examples, the delayed feedback transmission time based at least in part on a timing for tuning the transmitter from the second RAT to the first RAT.

Another apparatus for wireless communication is described. The apparatus may include means for receiving a first transmission according to a first RAT; means for determining a transmitter of the wireless communication device is tuned to a second RAT during a default feedback transmission time for the first transmission; and means for transmitting feedback for the first transmission at a delayed feedback transmission time for the first transmission. In some examples, the delayed feedback transmission time based at least in part on a timing for tuning the transmitter from the second RAT to the first RAT.

A non-transitory computer readable medium for wireless communication is described. The non-transitory computer-readable medium may include instructions operable to cause a processor to receive a first transmission according to a first RAT; determine a transmitter of the wireless communication device is tuned to a second RAT during a default feedback transmission time for the first transmission; and transmit feedback for the first transmission at a delayed feedback transmission time for the first transmission. In some examples, the delayed feedback transmission time based at least in part on a timing for tuning the transmitter from the second RAT to the first RAT.

Another method of wireless communication at a wireless communication device is described. The method may include receiving a first transmission according to a first RAT; determining an inability of the wireless communication device to transmit based at least in part on the first RAT during a default feedback transmission time for the first transmission; and transmitting feedback for the first transmission at a delayed feedback transmission time for the first transmission.

Another apparatus for wireless communication is described. The apparatus may include a processor, memory in electronic communication with the processor. The processor and memory may be configured to receive a first transmission according to a first RAT; determine an inability of the wireless communication device to transmit based at least in part on the first RAT during a default feedback transmission time for the first transmission; and transmit feedback for the first transmission at a delayed feedback transmission time for the first transmission.

Another apparatus for wireless communication is described. The apparatus may include means for receiving a first transmission according to a first RAT; means for determining an inability of the wireless communication device to transmit based at least in part on the first RAT during a default feedback transmission time for the first transmission; and means for transmitting feedback for the first transmission at a delayed feedback transmission time for the first transmission.

Another non-transitory computer readable medium for wireless communication is described. The non-transitory computer-readable medium may include instructions operable to cause a processor to receive a first transmission according to a first RAT; determine an inability of the wireless communication device to transmit based at least in part on the first RAT during a default feedback transmission time for the first transmission; and transmit feedback for the first transmission at a delayed feedback transmission time for the first transmission.

In some examples of the method, apparatus, and non-transitory computer-readable medium described above, the feedback for the first transmission comprises: a hybrid automatic repeat request (HARQ) acknowledgement (ACK) or a HARQ non-acknowledgement (NACK). In some examples of the method, apparatus, and non-transitory computer-readable medium described above, the first transmission is received during a first transmission time interval (TTI), and wherein the delayed feedback transmission time is during a second TTI.

Some examples of the method, apparatus, and non-transitory computer-readable medium described above may further include processes, features, means, or instructions for receiving a second transmission according to the first RAT. In some examples of the method, apparatus, and non-transitory computer-readable medium described above, the second transmission associated with a second default feedback transmission time during the second TTI. Some examples of the method, apparatus, and non-transitory computer-readable medium described above may further include processes, features, means, or instructions for transmitting combined feedback for the first transmission and the second transmission at the delayed feedback transmission time for the first transmission.

Some examples of the method, apparatus, and non-transitory computer-readable medium described above may further include processes, features, means, or instructions for selecting a control channel format for transmitting the combined feedback, the control channel format indicative of the combined feedback, and the control channel format selected from a plurality of control channel formats.

In some examples of the method, apparatus, and non-transitory computer-readable medium described above, the plurality of control channel formats are associated with: different scrambling sequences, or different encoding schemes, or different identifiers, or different combinations thereof.

In some examples of the method, apparatus, and non-transitory computer-readable medium described above, the default feedback transmission time is during the first TTI. In some examples of the method, apparatus, and non-transitory computer-readable medium described above, the feedback for the first transmission is transmitted within a medium access control (MAC) protocol data unit (PDU). Some examples of the method, apparatus, and non-transitory computer-readable medium described above may further include processes, features, means, or instructions for transmitting, with the feedback for the first transmission, delayed feedback for at least a second transmission according to the first RAT. In some examples of the method, apparatus, and non-transitory computer-readable medium described above, the delayed feedback transmission time is synchronized between the wireless communication device and a network device.

Another method of wireless communication at a wireless communication device is described. The method may include transmitting a first transmission, the first transmission associated with a default feedback transmission time for the first transmission; and receiving feedback for the first transmission at a delayed feedback transmission time for the first transmission.

Another apparatus for wireless communication is described. The apparatus may include a processor, memory in electronic communication with the processor. The processor and memory may be configured to transmit a first transmission, the first transmission associated with a default feedback transmission time for the first transmission; and receive feedback for the first transmission at a delayed feedback transmission time for the first transmission.

Another apparatus for wireless communication is described. The apparatus may include means for transmitting a first transmission, the first transmission associated with a default feedback transmission time for the first transmission; and means for receiving feedback for the first transmission at a delayed feedback transmission time for the first transmission.

Another non-transitory computer readable medium for wireless communication is described. The non-transitory computer-readable medium may include instructions operable to cause a processor to transmit a first transmission, the first transmission associated with a default feedback transmission time for the first transmission; and receive feedback for the first transmission at a delayed feedback transmission time for the first transmission.

In some examples of the method, apparatus, and non-transitory computer-readable medium described above, the delayed feedback transmission time is known to the wireless communication device prior to receiving the feedback for the first transmission.

Some examples of the method, apparatus, and non-transitory computer-readable medium described above may further include processes, features, means, or instructions for scheduling the delayed feedback transmission time based at least in part on a wireless communication device associated with the feedback being tuned to a second RAT.

In some examples of the method, apparatus, and non-transitory computer-readable medium described above, the feedback comprises: a HARQ ACK or a NACK. In some examples of the method, apparatus, and non-transitory computer-readable medium described above, the first transmission is transmitted during a first TTI and the delayed feedback transmission time is during a second TTI.

In some examples of the method, apparatus, and non-transitory computer-readable medium described above, the feedback for the first transmission is received in combined feedback for the first transmission and a second transmission at the delayed feedback transmission time for the first transmission, the second transmission associated with a second default feedback transmission time during the second TTI. In some examples of the method, apparatus, and non-transitory computer-readable medium described above, the combined feedback is received according to a control channel format indicative of the combined feedback, the control channel format one of a plurality of control channel formats. In some examples of the method, apparatus, and non-transitory computer-readable medium described above, the plurality of control channel formats are associated with: different scrambling sequences, or different encoding schemes, or different identifiers, or different combinations thereof. In some examples of the method, apparatus, and non-transitory computer-readable medium described above, the default feedback transmission time is during the first TTI.

In some examples of the method, apparatus, and non-transitory computer-readable medium described above, the feedback for the first transmission is received within a MAC PDU. Some examples of the method, apparatus, and non-transitory computer-readable medium described above may further include processes, features, means, or instructions for receiving, with the feedback for the first transmission, delayed feedback for at least a second transmission according to the first RAT.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described in which feedback for a received transmission is transmitted at a delayed feedback transmission time. Feedback for a received transmission may be transmitted at a delayed feedback transmission time when a transmitter of the wireless communication device is unable to transmit during a default feedback transmission time for the received transmission. In some examples, the wireless communication device may be unable to transmit during the default feedback transmission time because the received transmission and its feedback are associated with a first RAT, but the transmitter is tuned to a second RAT during the default feedback transmission time, or because a channel on which the transmitter transmits is already occupied. In these cases, the wireless communication device may transmit the feedback for the received transmission at the delayed feedback transmission time. In some examples, the delayed feedback transmission time may be based at least in part on a timing for tuning the transmitter from the second RAT to the first RAT. When a transmitter of a wireless communication device is able to transmit during a default feedback transmission time for a received transmission, feedback for the received transmission may be transmitted at the default feedback transmission time.

In some aspects, a wireless communication device that receives feedback at a delayed feedback transmission time may determine, in advance of receiving the feedback, that the feedback will be received at the delayed feedback transmission time. The determination may be based at least in part on knowledge of the scheduling of the wireless communication device that transmits the feedback. In some aspects, a wireless communication device that receives feedback at a delayed feedback transmission time may determine, in advance of receiving the feedback, that the feedback will be received at the delayed feedback transmission time based at least in part on a coordination between the wireless communication devices. In some examples, delayed feedback may be combined with other delayed or non-delayed feedback.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

Figure 1:
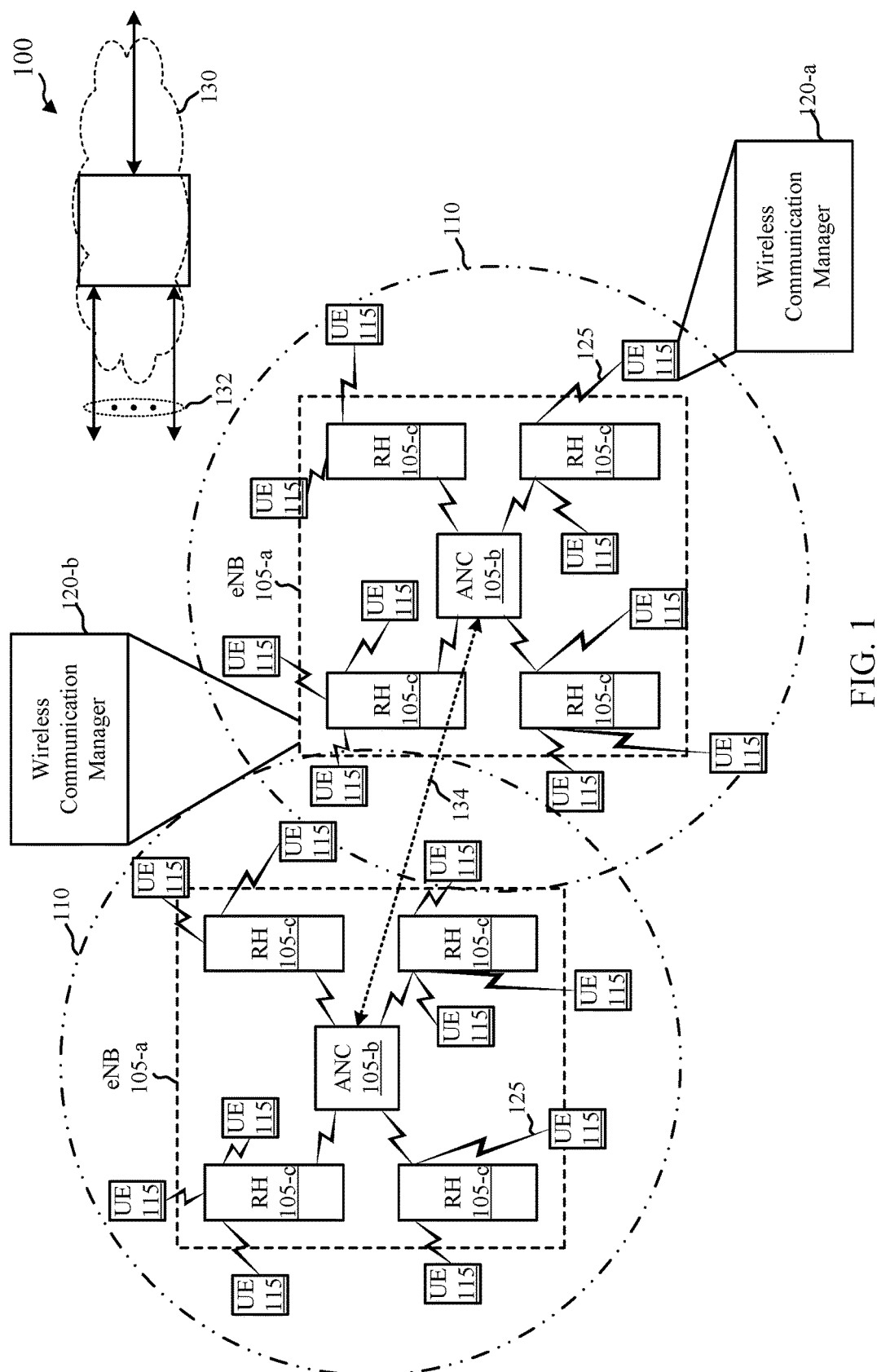
FIG. 1 shows an example of a wireless communication system, in accordance with one or more aspects of the present disclosure.

FIG. 1 shows an example of a wireless communication system 100, in accordance with one or more aspects of the disclosure. The wireless communication system 100 may include network access devices 105, UEs 115, and a core network 130. The core network 130 may provide user authentication, access authorization, tracking, Internet Protocol (IP) connectivity, and other access, routing, or mobility functions. At least some of the network access devices 105 (e.g., eNBs 105-a or ANCs 105-b) may interface with the core network 130 through backhaul links 132 (e.g., S1, S2, etc.) and may perform radio configuration and scheduling for communication with the UEs 115. In some examples, the ANCs 105-b may communicate, either directly or indirectly (e.g., through core network 130), with each other over backhaul links 134 (e.g., X1, X2, etc.), which may be wired or wireless communication links. Each ANC 105-b may also communicate with a number of UEs 115 through a number of (smart) RH 105-c. In an alternative configuration of the wireless communication system 100, the functionality of an ANC 105-b may be provided by a RH 105-c or distributed across the RHs 105-c of an eNB 105-a. In another alternative configuration of the wireless communication system 100, the RHs 105-c may be replaced with base stations, and the ANCs 105- may be replaced by base station controllers (or links to the core network 130). The wireless communication system 100 may also include a mix of RHs 105-c, base stations, and/or other network access devices for receiving/transmitting communications according to different RATs (e.g., LTE/LTE-A, 5G, Wi-Fi, etc.).

A macro cell may cover a relatively large geographic area (e.g., several kilometers in radius) and may allow unrestricted access by UEs 115 with service subscriptions with a network provider. A small cell may include a lower-powered RH or base station, as compared with a macro cell, and may operate in the same or different frequency band(s) as macro cells. Small cells may include pico cells, femto cells, and micro cells according to some examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the eNBs 105-a and/or RHs 105-c may have similar frame timing, and transmissions from different eNBs 105-a and/or RHs 105-c may be approximately aligned in time. For asynchronous operation, the eNBs 105-a and/or RHs 105-c may have different frame timings, and transmissions from different eNBs 105-a and/or RHs 105-c may not be aligned in time. The techniques described herein may be used for either synchronous or asynchronous operations.

The communication networks that may accommodate some of the disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use HARQ to provide retransmission at the MAC layer to improve link efficiency.

In the control plane, the Radio Resource Control (RRC) protocol layer may provide establishment, configuration, and maintenance of an RRC connection between a UE 115 and a RH 105-c, ANC 105-b, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an internet of everything (IoE) device, or the like. A UE may be able to communicate with various types of eNBs 105-a, RHs 105-c, base stations, access points, or other network access devices, including macro eNBs, small cell eNBs, relay base stations, and the like. A UE may also be able to communicate directly with other UEs (e.g., using a peer-to-peer (P2P) protocol).

The communication links 125 shown in wireless communication system 100 may include ULs from a UE 115 to a RH 105-c, and/or DLs, from a RH 105-c to a UE 115. The DLs may also be called forward links, while the ULs may also be called reverse links. Control information and data may be multiplexed on an UL or DL according to various techniques. Control information and data may be multiplexed on an UL or DL, for example, using time-division multiplexing (TDM) techniques, frequency-division multiplexing (FDM) techniques, or hybrid TDM-FDM techniques.

One or more of the UEs 115 may include a wireless communication manager 120-a. In some examples, the wireless communication manager 120-a may be an example of the wireless communication manager 520, 520-a, or 950 described with reference to FIG. 5, 6, or 9, and may be used to receive a first transmission according to a first RAT; to determine a transmitter of the wireless communication device is switched or tuned to a second RAT during a default feedback transmission time for the first transmission; and to transmit feedback for the first transmission at a delayed feedback transmission time for the first transmission. The delayed feedback transmission time may be based at least in part on a timing for switching the transmitter from the second RAT to the first RAT. In some examples, the wireless communication manager 120-b may be an example of the wireless communication manager 720, 720-a, or 950 described with reference to FIG. 7, 8, or 9, and may be used to transmit a first transmission, in which the first transmission may be associated with a default feedback transmission time for the first transmission; and to receive feedback for the first transmission at a delayed feedback transmission time for the first transmission.

One or more of the network access devices 105 (e.g., one or more eNBs 105-a) may include a wireless communication manager 120-b. In some examples, the wireless communication manager 120-b may be an example of the wireless communication manager 520, 520-a, or 1060 described with reference to FIG. 5, 6, or 10, and may be used to receive a first transmission according to a first RAT; to determine a transmitter of the wireless communication device is tuned to a second RAT during a default feedback transmission time for the first transmission; and to transmit feedback for the first transmission at a delayed feedback transmission time for the first transmission. The delayed feedback transmission time may be based at least in part on a timing for tuning the transmitter from the second RAT to the first RAT. In some examples, the delayed feedback transmission time is synchronized between UE 115 and a network device (e.g., eNBs 105-*a*, ANC 105-*b*, or RH 105-*c*). In some examples, the wireless communication manager 120-*b* may be an example of the wireless communication manager 720, 720-*a*, or 1060 described with reference to FIG. 7, 8, or 10, and may be used to transmit a first transmission, in which the first transmission may be associated with a default feedback transmission time for the first transmission; and to receive feedback for the first transmission at a delayed feedback transmission time for the first transmission.

Each of the communication links 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing (TDD) techniques (e.g., using unpaired spectrum resources). Frame structures for FDD (e.g., frame structure type 1) and TDD (e.g., frame structure type 2) may be defined.

In some examples of the wireless communication system 100, the RHs 105-*c* and/or UEs 115 may include multiple antennas for employing antenna diversity schemes to improve communication quality and reliability between RHs 105-*c* and UEs 115. Additionally or alternatively, RHs 105-*c* and/or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple DL CCs and one or more UL CCs for carrier aggregation. Carrier aggregation may be used with both FDD and TDD component carriers.

Figure 2:
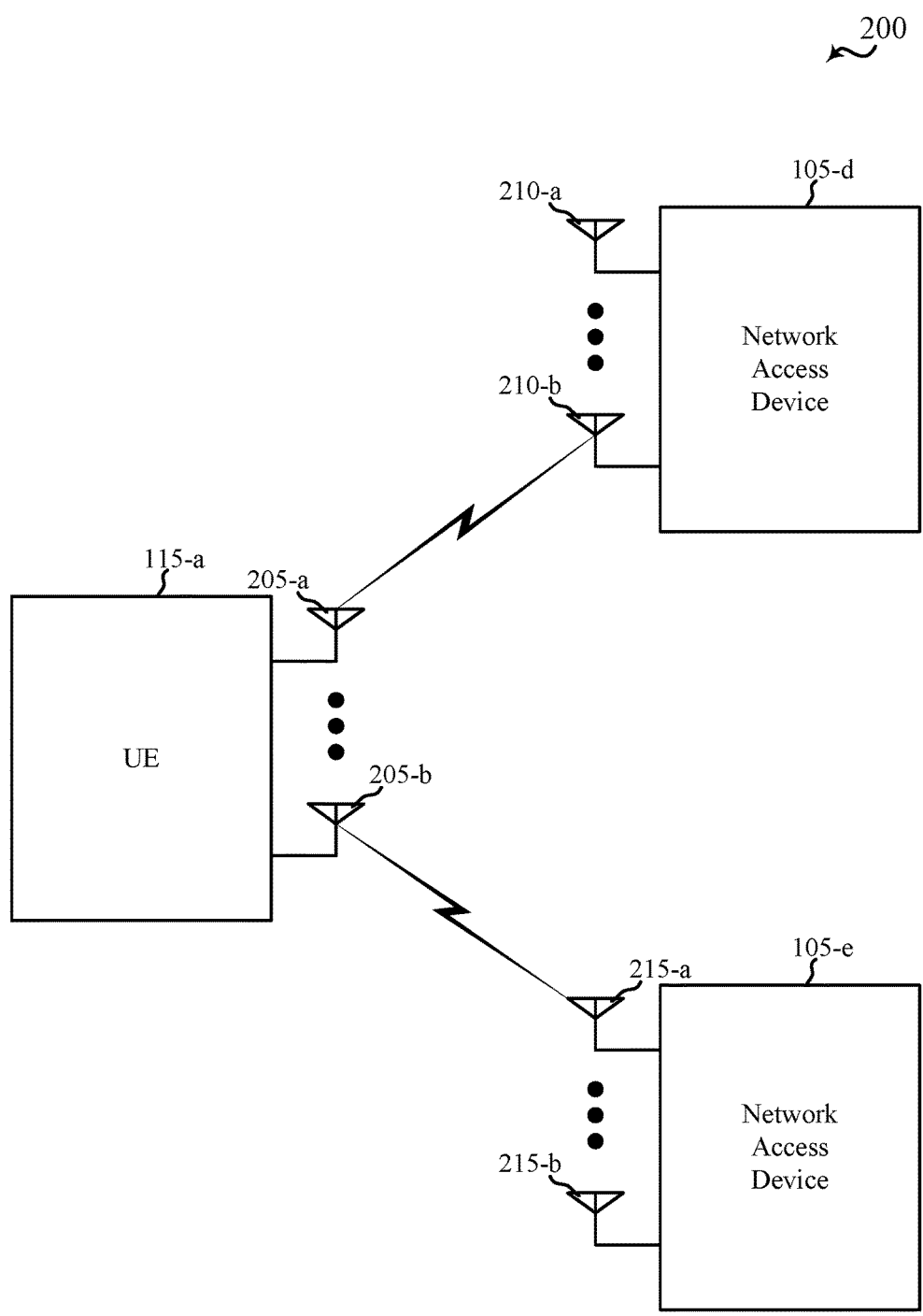
FIG. 2 shows an example of a wireless communication system, in accordance with one or more aspects of the present disclosure.

FIG. 2 shows an example of a wireless communication system 200, in accordance with one or more aspects of the disclosure. The wireless communication system 200 may include a UE 115-*a*, a first network access device 105-*d*, and a second network access device 105-*e*. The UE 115-*a*, first network access device 105-*d*, and second network access device 105-*e* may be examples of aspects of the UEs 115 and network access devices 105 described with reference to FIG. 1.

Each of the UE 115-*a*, the first network access device 105-*d*, and the second network access device 105-*e* may include a number of antennas (e.g., one or more antennas). By way of example, the UE 115-*a* is shown to have at least a first antenna 205-*a* and a second antenna 205-*b*, the first network access device 105-*d* is shown to have at least a first antenna 210-*a* and a second antenna 210-*b*, and the second network access device 105-*e* is shown to have at least a first antenna 215-*a* and a second antenna 215-*b*.

In some examples, the UE 115-*a* may maintain two or more concurrent active connections (e.g., simultaneous connections). The two or more concurrent active connections may be based on the same RAT or different RATs. Same RAT connections may be referred to as intra-RAT connections. Different RAT connections may be referred to as inter-RAT connections. Some example scenarios of two or more concurrent active connections include:

LTE/LTE-A+5G (e.g., a dual-connectivity scenario in which LTE/LTE-A is used as the primary RAT)
    LTE/LTE-A VoIP/1×/GSM/WCDMA Voice+5G Data
    5G+5G/LTE/LTE-A/WLAN (e.g., a dual-connectivity scenario in which 5G is used as the primary RAT)
    Dual-SIM Dual-Active (DSDA)

Providing the UE 115-*a* with multiple (e.g., dual) radios for concurrent RAT operation can be expensive in terms of cost, power, etc., and can lead to in-device coexistence issues in which transmission/reception using one RAT interferes with transmission/reception using another RAT. Enabling a UE to not transmit or receive on certain occasions, with network cooperation, can sometimes alleviate some of these issues. For example, enabling a UE to not transmit or receive on certain occasions can enable time sharing of a radio between two concurrent active connections (e.g., one connection between the second antenna 205-*b* of the UE 115-*a* and the second antenna 210-*b* of the first network access device 105-*d*, and one connection between the second antenna 205-*b* of the UE 115-*a* and the first antenna 215-*a* of the second network access device 105-*e*) and, in some cases, provide cost or power savings. Enabling a UE to not transmit or receive on certain occasions can also mitigate (or resolve) in-device coexistence issues (e.g., interference between transmissions/receptions based on different RATs).

In some examples, the UE 115-*a* may have one or more receive chains but only a single transmit chain, with the transmit chain being time-shared by different RATs. In some examples, the UE 115-*a* may have a single transmit chain and single receive chain, with each of the transmit chain and the receive chain being time-shared by different RATs.

Figure 3:
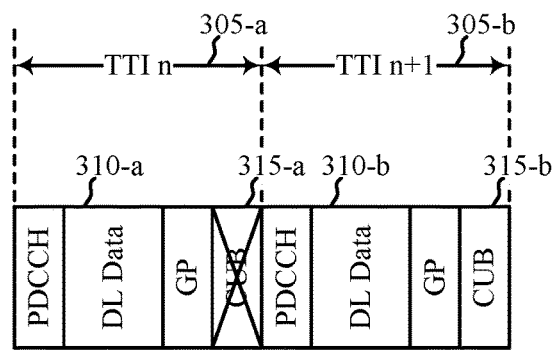
FIG. 3 shows a timing diagram of transmissions based on a first RAT (e.g., 5G), in accordance with one or more aspects of the present disclosure

FIG. 3 shows a timing diagram 300 of transmissions based on a first RAT (e.g., 5G), in accordance with one or more aspects of the disclosure. The transmissions based on the first RAT may be transmitted and received within a series of TTIs (e.g., a series of subframes, slots of subframes, symbol periods of subframes, or other time periods, including, for example, a first TTI 305-*a* and a second TTI 305-*b*). In some examples, the transmissions may include control and/or data transmissions transmitted from a first wireless communication device to a second wireless communication device, and NACK and/or ACK N/A transmissions from the second wireless communication device to the first wireless communication device. In some examples, and as shown in FIG. 3, the first wireless communication device may be a network access device and the second wireless communication device may be a UE, the control transmissions may include a physical downlink control channel (PDCCH), the data transmissions may include DL data, and the N/A transmissions may be transmitted as part of a common UL burst (CUB). The DL data and CUB may be separated by a guard period (GP). In other examples (not shown), the first wireless communication device may be a UE, the second wireless communication device may be a network access device, the control transmissions may include a physical uplink control channel (PUCCH), the data transmissions may include UL data, and the N/A transmissions may be transmitted as part of a PDCCH (or part of DL data) in a next TTI. The network access device may be an example of aspects of the network access devices 105 (e.g., an eNB, an ANC, a RH, or a base station) described with reference to FIG. 1 or 2, and the UE may be an example of aspects of the UEs 115 described with reference to FIG. 1 or 2.

In some examples, a UE may receive a first transmission 310-a (e.g., PDCCH and DL data) from a network access device, according to the first RAT, during the first TTI 305-a (i.e., during TTI n). The UE may determine that a transmitter of the UE is unable to transmit based on the first RAT during a default feedback transmission time for the first transmission 310-a (e.g., during a first CUB 315-a, during the first TTI 305-a). In some examples, the transmitter of the UE may be unable to transmit because the transmitter is switched or tuned to a second RAT (e.g., LTE/LTE-A) during the default feedback transmission time, or because a channel on which the transmitter transmits is already occupied. In response to determining that the transmitter of the UE is unable to transmit based on the first RAT during the default feedback transmission time, the UE may delay the transmission of feedback for the first transmission 310-a.

The UE may receive a second transmission 310-b (e.g., PDCCH and DL data) from the network access device, according to the first RAT, during the second TTI 305-b (i.e., during TTI n+1). The UE may determine that the transmitter of the UE is able to transmit based on the first RAT during a second default feedback transmission time for the second transmission 310-b (e.g., during a second CUB 315-b, during the second TTI 305-b), and may transmit a NACK or ACK of the second transmission 310-b during the second default feedback transmission time. In addition, the UE may transmit delayed feedback (e.g., a NACK or ACK) for the first transmission 310-a during the second CUB 315-b. The UE may determine that the transmitter of the UE is able to transmit based on the first RAT, for example, because the transmitter has switched (or will switch) or tuned back to the first RAT before the second CUB 315-b.

In some examples, the UE may combine feedback for the first transmission 310-a and the second transmission 310-b (e.g., at Layer 1). In some examples, the UE may select a control channel format for transmitting the combined feedback for the first transmission 310-a and the second transmission 310-b. The control channel format may be indicative of the combined feedback, and in some examples may be selected from a plurality of control channel formats. In some examples, the plurality of control channel formats may be associated with: different scrambling sequences, or different encoding schemes, or different identifiers (e.g., explicit or implicit identifiers), or different combinations thereof. In some examples, the combined feedback for the first transmission and the second transmission may be transmitted in a data channel (e.g., within a MAC PDU (e.g., as part of Layer 2, along with data (if any))).

In some examples, the feedback for the first transmission 310-a or the second transmission 310-b may include a HARQ NACK or a HARQ ACK. A single HARQ NACK or HARQ ACK may be provided as combined feedback for the first transmission 310-a and the second transmission 310-b, or a HARQ NACK or HARQ ACK may be provided for each of the first transmission 310-a and the second transmission 310-b.

Figure 4:
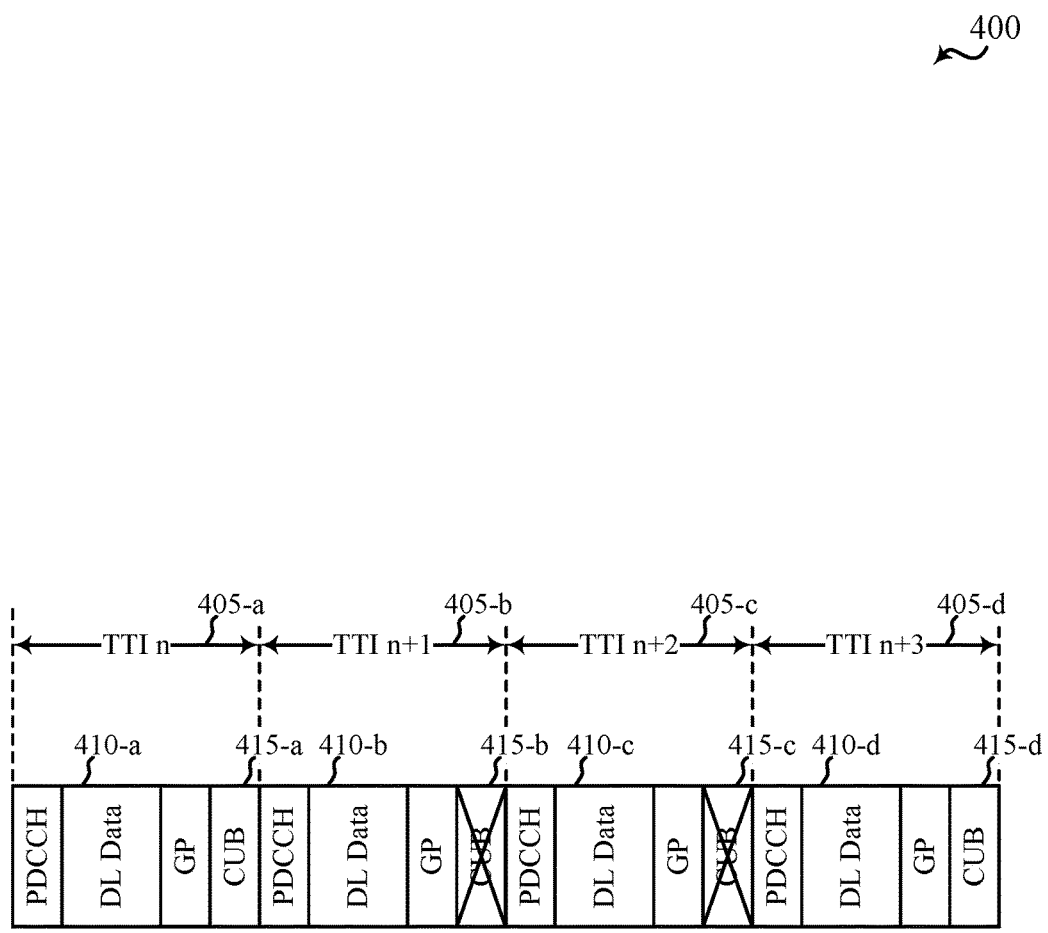
FIG. 4 shows a timing diagram of transmissions based on a first RAT (e.g., 5G), in accordance with one or more aspects of the present disclosure.

FIG. 4 shows a timing diagram 400 of transmissions based on a first RAT (e.g., 5G), in accordance with one or more aspects of the disclosure. The transmissions based on the first RAT may be transmitted and received within a series of TTIs (including, for example, a first TTI 405-a, a second TTI 405-b, a third TTI 405-c, and a fourth TTI 405-d). In some examples, the transmissions may include control and/or data transmissions transmitted from a first wireless communication device to a second wireless communication device, and N/A transmissions from the second wireless communication device to the first wireless communication device. In some examples, and as shown in FIG. 4, the first wireless communication device may be a network access device and the second wireless communication device may be a UE, the control transmissions may include a PDCCH, the data transmissions may include DL data, and the N/A transmissions may be transmitted as part of a CUB. The DL data and CUB may be separated by a GP. In other examples (not shown), the first wireless communication device may be a UE, the second wireless communication device may be a network access device, the control transmissions may include a PUCCH, the data transmissions may include UL data, and the N/A transmissions may be transmitted as part of a PDCCH (or part of DL data) in a next TTI. The network access device may be an example of aspects of the network access devices 105 (e.g., an eNB, an ANC, a RH, or a base station) described with reference to FIG. 1 or 2, and the UE may be an example of aspects of the UEs 115 described with reference to FIG. 1 or 2.

In some examples, a UE may receive a first transmission 410-a (e.g., PDCCH and DL data) from a network access device, according to the first RAT, during the first TTI 405-a (i.e., during TTI n). The UE may determine that a transmitter of the UE is able to transmit based on the first RAT during a default feedback transmission time for the first transmission 410-a (e.g., during a first CUB 415-a, during the first TTI 405-a), and may transmit a NACK or ACK of the first transmission 410-a during the default feedback transmission time.

The UE may receive a second transmission 410-b (e.g., PDCCH and DL data) from the network access device, according to the first RAT, during the second TTI 405-b (i.e., during TTI n+1). The UE may determine that the transmitter of the UE is unable to transmit based on the first RAT during a second default feedback transmission time for the second transmission 410-b (e.g., during a second CUB 415-b, during the second TTI 405-b). In some examples, the transmitter of the UE may be unable to transmit because the transmitter is switched or tuned to a second RAT (e.g., LTE/LTE-A) during the second default feedback transmission time, or because a channel on which the transmitter transmits is already occupied. In response to determining that the transmitter of the UE is unable to transmit based on the first RAT during the second default feedback transmission time, the UE may delay the transmission of feedback for the second transmission 410-b.

The UE may receive a third transmission 410-c (e.g., PDCCH and DL data) from the network access device, according to the first RAT, during the third TTI 405-c (i.e., during TTI n+2). The UE may determine that the transmitter of the UE is unable to transmit based on the first RAT during a third default feedback transmission time for the third transmission 410-c (e.g., during a third CUB 415-b, during the third TTI 405-c). In some examples, the transmitter of the UE may be unable to transmit because the transmitter is switched or tuned to the second RAT during the third default feedback transmission time. In response to determining that the transmitter of the UE is unable to transmit based on the first RAT during the third default feedback transmission time, the UE may delay the transmission of feedback for the third transmission 410-c, and continue to delay the transmission of feedback for the second transmission 410-b.

The UE may receive a fourth transmission 410-d (e.g., PDCCH and DL data) from the network access device, according to the first RAT, during the fourth TTI 405-d (i.e., during TTI n+3). The UE may determine that the transmitter of the UE is able to transmit based on the first RAT during a fourth default feedback transmission time for the fourth transmission 410-d (e.g., during a fourth CUB 415-d, during the fourth TTI 405-d), and may transmit a NACK or ACK of the fourth transmission 410-d during the fourth default feedback transmission time. In addition, the UE may transmit delayed feedback (e.g., a NACK or ACK) for the second transmission 410-b and the third transmission 410-c during the fourth CUB 415-d. The UE may determine that the transmitter of the UE is able to transmit based on the first RAT, for example, because the transmitter has switched (or will switch) or tuned back to the first RAT before the fourth CUB 415-d.

In some examples, the UE may combine feedback for the second transmission 410-b, the third transmission 410-c, and the fourth transmission 410-d (e.g., at Layer 1). In some examples, the UE may select a control channel format for transmitting the combined feedback for the second transmission 410-b, the third transmission 410-c, and the fourth transmission 410-d. The control channel format may be indicative of the combined feedback, and in some examples may be selected from a plurality of control channel formats. In some examples, the plurality of control channel formats may be associated with different scrambling sequences, or different encoding schemes, or different identifiers (e.g., explicit or implicit identifiers), or different combinations thereof. In some examples, the combined feedback for the second transmission 410-b, the third transmission 410-c, and the fourth transmission 410-d may be transmitted in a data channel (e.g., within a MAC PDU (e.g., as part of Layer 2, along with data (if any))).

In some examples, the feedback for the first transmission 410-a, the second transmission 410-b, the third transmission 410-c, or the fourth transmission 410-d may include a HARQ NACK or a HARQ ACK. A single HARQ NACK or HARQ ACK may be provided as combined feedback for the second transmission 410-b, the third transmission 410-c, and the fourth transmission 410-d, or a separate HARQ NACK or HARQ ACK may be provided for each of the second transmission 410-b, the third transmission 410-c, and the fourth transmission 410-d.

Figure 5:
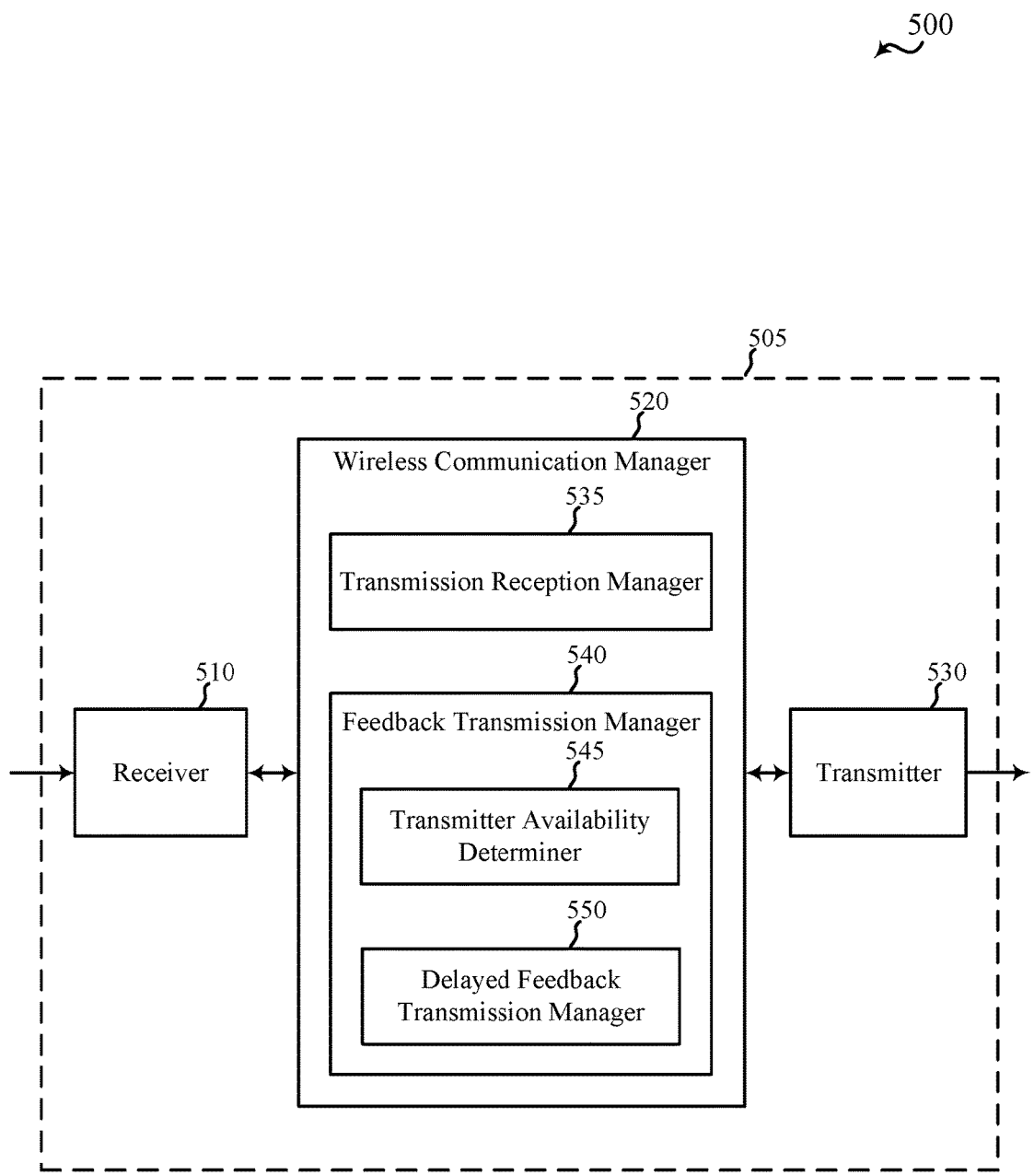
FIG. 5 shows a block diagram of an apparatus for use in wireless communication, in accordance with one or more aspects of the present disclosure.

FIG. 5 shows a block diagram 500 of an apparatus 505 for use in wireless communication, in accordance with one or more aspects of the present disclosure. The apparatus 505 may be an example of aspects of one or more of the UEs 115 or network access devices 105 (e.g., an eNB, an ANC, a RH, or a base station) described with reference to FIG. 1 or 2. The apparatus 505 may also be or include a processor. The apparatus 505 may include a receiver 510, a wireless communication manager 520, or a transmitter 530. Each of these components may be in communication with each other.

The components of the apparatus 505 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions implemented in a memory, formatted to be executed by one or more general or application-specific processors.

In some examples, the receiver 510 may include at least one radio frequency (RF) receiver, such as at least one RF receiver operable to receive transmissions over one or more RF spectrum bands. In some examples, the one or more RF spectrum bands may be used for LTE/LTE-A or 5G communications, as described, for example, with reference to FIG. 1, 2, 3, or 4. The receiver 510 may be used to receive various types of data or control signals (i.e., transmissions) over one or more communication links of a wireless communication system, such as one or more communication links of the wireless communication system 100 described with reference to FIG. 1.

In some examples, the transmitter 530 may include at least one RF transmitter, such as at least one RF transmitter operable to transmit over one or more RF spectrum bands. In some examples, the one or more RF spectrum bands may be used for LTE/LTE-A or 5G communications, as described, for example, with reference to FIG. 1, 2, 3, or 4. The transmitter 530 may be used to transmit various types of data or control signals (i.e., transmissions) over one or more communication links of a wireless communication system, such as one or more communication links of the wireless communication system 100 described with reference to FIG. 1.

In some examples, the wireless communication manager 520 may be used to manage one or more aspects of wireless communication for the apparatus 505. In some examples, part of the wireless communication manager 520 may be incorporated into or shared with the receiver 510 or the transmitter 530. In some examples, the wireless communication manager 520 may be an example of aspects of the wireless communication manager 120-a or 120-b described with reference to FIG. 1. In some examples, the wireless communication manager 520 may include a transmission reception manager 535 or a feedback transmission manager 540.

The transmission reception manager 535 may be used to receiving a first transmission according to a first RAT. In some examples, the first transmission may be received during a first TTI.

The feedback transmission manager 540 may include a transmitter availability determiner 545 or a delayed feedback transmission manager 550. The transmitter availability determiner 545 may be used to determine an inability of the apparatus 505 to transmit based on the first RAT during a default feedback transmission time for the first transmission (e.g., because a transmitter of the apparatus 505 is switched or tuned to a second RAT during the default feedback transmission time for the first transmission). In some examples, the default feedback transmission time may be during the first TTI. In other examples, the default feedback transmission time may be during a TTI other than the first TTI.

The delayed feedback transmission manager 550 may be used to transmit feedback for the first transmission at a delayed feedback transmission time for the first transmission. In some examples, the delayed feedback transmission time may be based on a timing for switching or tuning the transmitter from the second RAT to the first RAT. In some examples, the delayed feedback transmission time may be during a second TTI. In some examples, the feedback for the first transmission may include a HARQ ACK or a HARQ NACK. In some examples, the feedback for the first transmission may be transmitted within a MAC PDU. In some examples, the delayed feedback transmission manager 550 may transmit, with the feedback for the first transmission, delayed feedback for at least a second transmission according to the first RAT.

Figure 6:
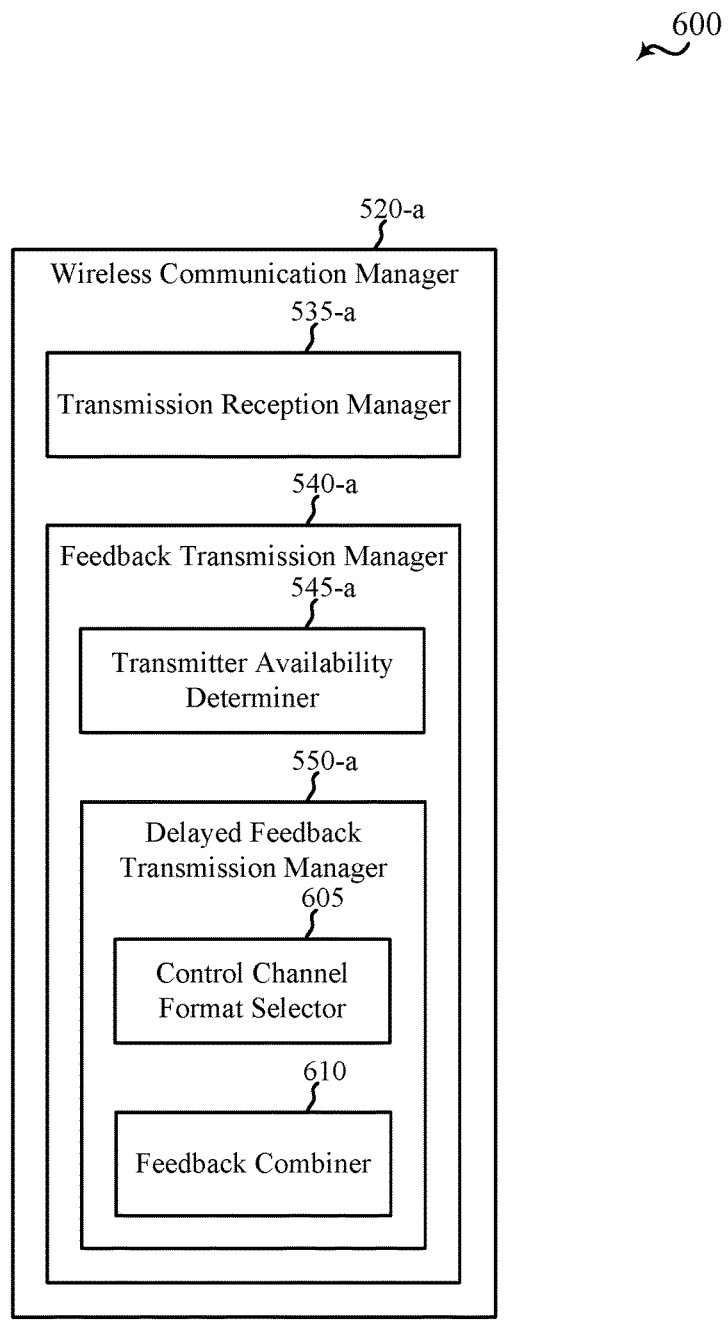
FIG. 6 shows a block diagram of a wireless communication manager for use in wireless communication, in accordance with one or more aspects of the present disclosure.

FIG. 6 shows a block diagram 600 of a wireless communication manager 520-*a* for use in wireless communication, in accordance with one or more aspects of the present disclosure. The wireless communication manager 520-*a* may be an example of aspects of the wireless communication manager 120-*a*, 120-*b*, or 520 described with reference to FIG. 1 or 5.

The components of the wireless communication manager 520-*a* may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions implemented in a memory, formatted to be executed by one or more general or application-specific processors.

In some examples, the wireless communication manager 520-*a* may be used to manage one or more aspects of wireless communication for a wireless communication device (e.g., a UE or network access device) or apparatus, such as one of the UEs 115, network access devices 105 (e.g., an eNB, an ANC, a RH, or a base station), or apparatus 505 described with reference to FIG. 1, 2, or 5. In some examples, part of the wireless communication manager 520-*a* may be incorporated into or shared with a receiver or a transmitter (e.g., the receiver 510 or the transmitter 530 described with reference to FIG. 5). In some examples, the wireless communication manager 520-*a* may include a transmission reception manager 535-*a* or a feedback transmission manager 540-*a*.

The transmission reception manager 535-*a* may be used to receiving a first transmission according to a first RAT. In some examples, the first transmission may be received during a first TTI. The transmission reception manager 535-*a* may also be used to receive additional transmissions according to the first RAT (e.g., a second transmission, which second transmission may be received during a second TTI).

The feedback transmission manager 540-*a* may include a transmitter availability determiner 545-*a* or a delayed feedback transmission manager 550-*a*. The transmitter availability determiner 545-*a* may be used to determine an inability of an apparatus including the wireless communication manager 520-*a* to transmit based on the first RAT during a default feedback transmission time for the first transmission (e.g., because a transmitter of the apparatus is switched or tuned to a second RAT during the default feedback transmission time for the first transmission). In some examples, the default feedback transmission time may be during the first TTI. In other examples, the default feedback transmission time may be during a TTI other than the first TTI. In some examples, the delayed feedback transmission time may be synchronized between a UE (e.g., UEs 115) and one or more network devices (e.g., eNBs 105-*a*, ANCs 105-*b*, and/or RHs 105-*c*).

In some examples, a second default feedback transmission time associated with the second transmission may also be during the second TTI. The delayed feedback transmission manager 550-*a* may be used to transmit combined feedback for the first transmission and the second transmission at a delayed feedback transmission time for the first transmission. The delayed feedback transmission time may be based on a timing for switching or tuning the transmitter from the second RAT to the first RAT. In some examples, the delayed feedback transmission time may be during the second TTI. In some examples, the combined feedback for the first transmission and the second transmission may be transmitted in a control channel or a data channel (e.g., within a MAC PDU (along with data (if any))).

The delayed feedback transmission manager 550-*a* may include a control channel format selector 605 or a feedback combiner 610. The control channel format selector 605 may be used to optionally select a control channel format for transmitting the combined feedback for the first transmission and the second transmission. The control channel format may be indicative of the combined feedback, and in some examples may be selected from a plurality of control channel formats. In some examples, the plurality of control channel formats may be associated with different scrambling sequences, or different encoding schemes, or different identifiers, or different combinations thereof. The feedback combiner 610 may be used to combine the feedback for the first transmission and the second transmission. In some examples, the combined feedback for the first transmission and the second transmission may include a HARQ ACK or a HARQ NACK. In some examples, the combined feedback may include feedback for more than the first transmission and the second transmission.

Figure 7:
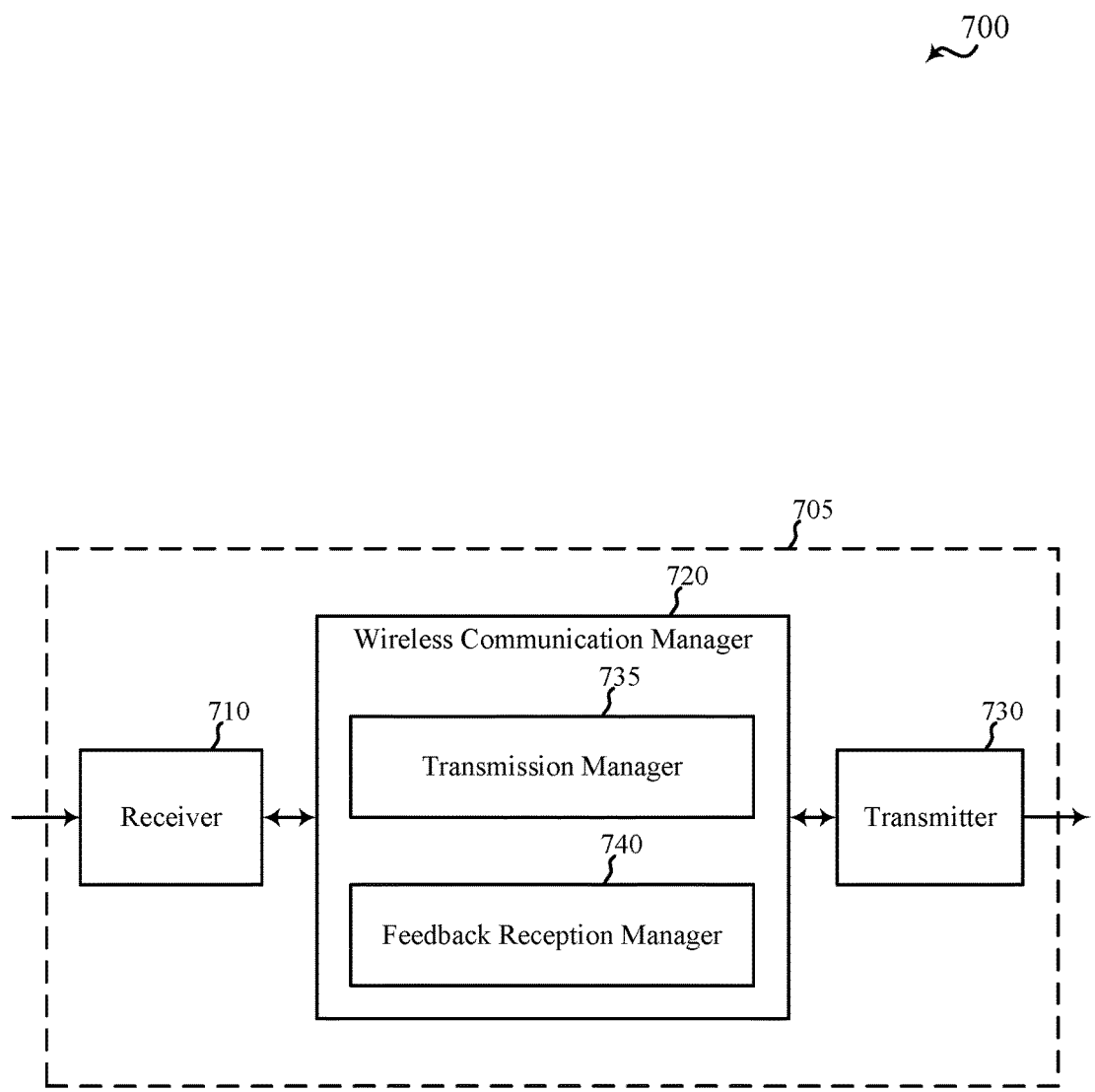
FIG. 7 shows a block diagram of an apparatus for use in wireless communication, in accordance with one or more aspects of the present disclosure.

FIG. 7 shows a block diagram 700 of an apparatus 705 for use in wireless communication, in accordance with one or more aspects of the present disclosure. The apparatus 705 may be an example of aspects of one or more of the UEs 115 or network access devices 105 (e.g., an eNB, an ANC, a RH, or a base station) described with reference to FIG. 1 or 2. The apparatus 705 may also be or include a processor. The apparatus 705 may include a receiver 710, a wireless communication manager 720, or a transmitter 730. Each of these components may be in communication with each other.

The components of the apparatus 705 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions implemented in a memory, formatted to be executed by one or more general or application-specific processors.

In some examples, the receiver 710 may include at least one RF receiver, such as at least one RF receiver operable to receive transmissions over one or more RF spectrum bands. In some examples, the one or more RF spectrum bands may be used for LTE/LTE-A or 5G communications, as described, for example, with reference to FIG. 1, 2, 3, or 4. The receiver 710 may be used to receive various types of data or control signals (i.e., transmissions) over one or more communication links of a wireless communication system, such as one or more communication links of the wireless communication system 100 described with reference to FIG. 1.

In some examples, the transmitter 730 may include at least one RF transmitter, such as at least one RF transmitter operable to transmit over one or more RF spectrum bands. In some examples, the one or more RF spectrum bands may be used for LTE/LTE-A or 5G communications, as described, for example, with reference to FIG. 1, 2, 3, or 4. The transmitter 730 may be used to transmit various types of data or control signals (i.e., transmissions) over one or more communication links of a wireless communication system, such as one or more communication links of the wireless communication system 100 described with reference to FIG. 1.

In some examples, the wireless communication manager 720 may be used to manage one or more aspects of wireless communication for the apparatus 705. In some examples, part of the wireless communication manager 720 may be incorporated into or shared with the receiver 710 or the transmitter 730. In some examples, the wireless communication manager 720 may be an example of aspects of the wireless communication manager 120-*a* or 120-*b* described with reference to FIG. 1. In some examples, the wireless communication manager 720 may include a transmission manager 735 or a feedback reception manager 740.

The transmission manager 735 may be used to transmit a first transmission according to a first RAT. In some examples, the first transmission may be transmitted during a first TTI. The first transmission may be associated with a default feedback transmission time for the first transmission. In some examples, the default feedback transmission time may be during the first TTI. In other examples, the default feedback transmission time may be during a TTI other than the first TTI.

The feedback reception manager 740 may be used to receive feedback for the first transmission at a delayed feedback transmission time for the first transmission. In some examples, the delayed feedback transmission time may be during a second TTI. In some examples, the delayed feedback transmission time may be known to the apparatus 705 prior to receiving the feedback for the first transmission (e.g., because the apparatus 705 knows when a receiver of the first transmission is able and unable to transmit the feedback for the first transmission). In some examples apparatus 705 may schedule the delayed feedback transmission time based at least in part on a prior knowledge of a receiver of the first transmission being able and unable to transmit the feedback for the first transmission. In some examples, the feedback for the first transmission may include a HARQ ACK or a HARQ NACK. In some examples, the feedback for the first transmission may be received in a control channel or a data channel (e.g., within a MAC PDU (along with data (if any))).

Figure 8:
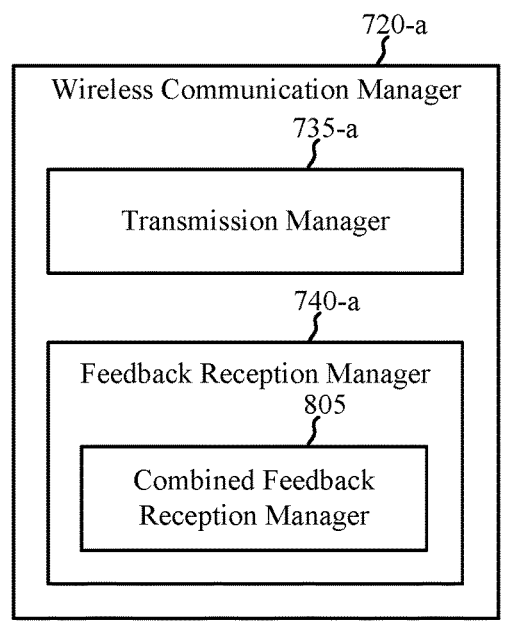
FIG. 8 shows a block diagram of a wireless communication manager for use in wireless communication, in accordance with one or more aspects of the present disclosure.

FIG. 8 shows a block diagram 800 of a wireless communication manager 720-*a* for use in wireless communication, in accordance with one or more aspects of the present disclosure. The wireless communication manager 720-*a* may be an example of aspects of the wireless communication manager 120-*a*, 120-*b*, or 720 described with reference to FIG. 1 or 7.

The components of the wireless communication manager 720-*a* may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 720-*a* may be used to manage one or more aspects of wireless communication for a wireless communication device (e.g., a UE or network access device) or apparatus, such as one of the UEs 115, network access devices 105 (e.g., an eNB, an ANC, a RH, or a base station), or apparatus 705 described with reference to FIG. 1, 2, or 7. In some examples, part of the wireless communication manager 720-*a* may be incorporated into or shared with a receiver or a transmitter (e.g., the receiver 710 or the transmitter 730 described with reference to FIG. 7). In some examples, the wireless communication manager 720-*a* may include a transmission manager 735-*a* or a feedback reception manager 740-*a*.

The transmission manager 735-*a* may be used to transmit a first transmission according to a first RAT. In some examples, the first transmission may be transmitted during a first TTI. The first transmission may be associated with a default feedback transmission time for the first transmission. In some examples, the default feedback transmission time may be during the first TTI. The transmission manager 735-*a* may also be used to transmit additional transmissions according to the first RAT (e.g., a second transmission, which second transmission may be transmitted during a second TTI). In some examples, the second transmission may be associated with a second default feedback transmission time during the second TTI. In other examples, the default feedback transmission time may be during a TTI other than the first TTI.

The feedback reception manager 740-*a* may include a combined feedback reception manager 805. The combined feedback reception manager 805 may be used to receive combined feedback for the first transmission and the second transmission, at a delayed feedback transmission time for the first transmission. In some examples, the delayed feedback transmission time may be during the second TTI. In some examples, the delayed feedback transmission time may be known to an apparatus including the wireless communication manager 720-*a* prior to receiving the combined feedback for the first transmission and the second transmission (e.g., because the apparatus knows when a receiver of the first transmission is able and unable to transmit the feedback for the first transmission, the feedback for the first transmission, or a combination thereof). In some examples, the combined feedback for the first transmission and the second transmission may include a HARQ ACK or a HARQ NACK. In some examples, the combined feedback for the first transmission and the second transmission may be received in a control channel or a data channel (e.g., within a MAC PDU (along with data (if any))). In some examples, the combined feedback received by the combined feedback reception manager 805 may include feedback for more than the first transmission and the second transmission.

In some examples, the combined feedback reception manager 805 may receive the combined feedback according to a control channel format indicative of the combined feedback. In some examples, the control channel format may be one of a plurality of control channel formats. In some examples, the plurality of control channel formats may be associated with different scrambling sequences, or different encoding schemes, or different identifiers, or different combinations thereof.

Figure 9:
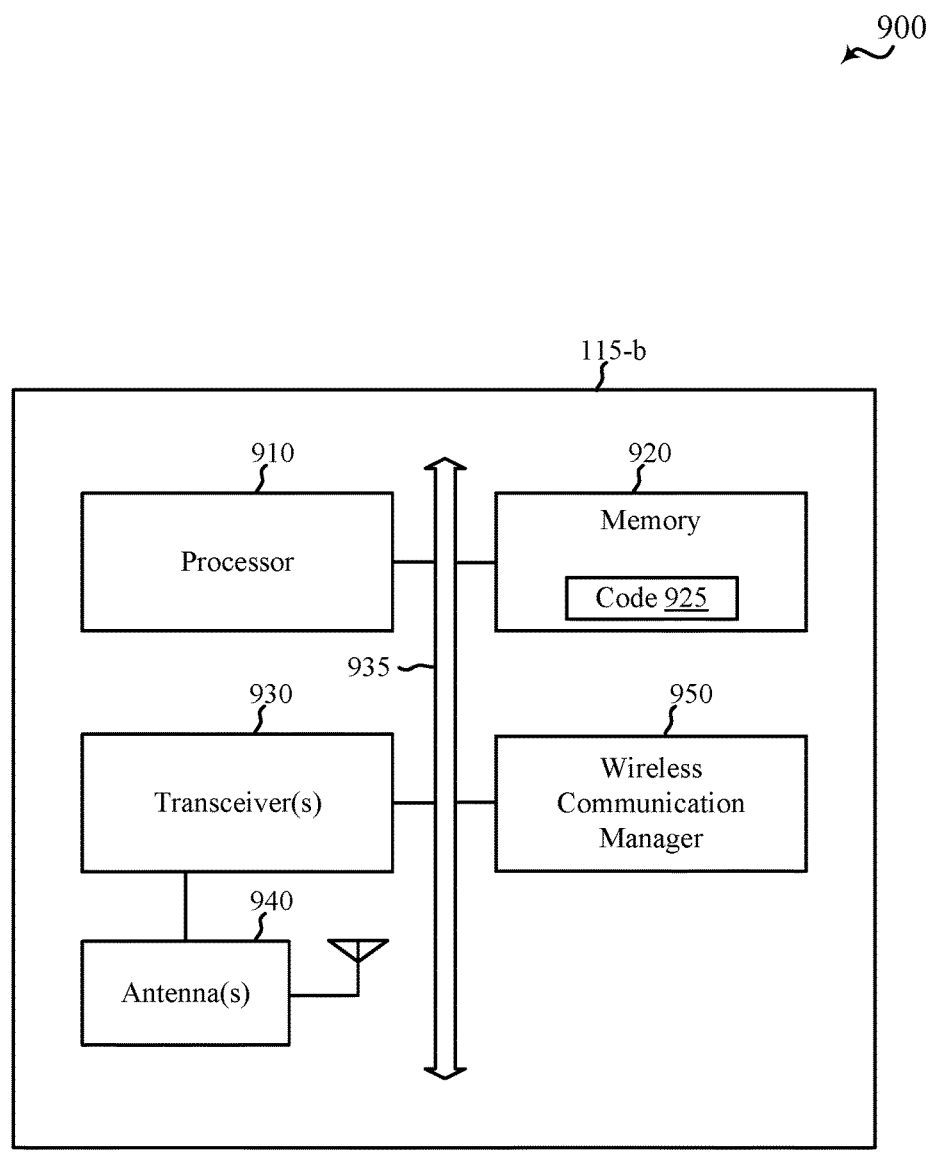
FIG. 9 shows a block diagram of a UE for use in wireless communication, in accordance with one or more aspects of the present disclosure.

FIG. 9 shows a block diagram 900 of a UE 115-*b* for use in wireless communication, in accordance with one or more aspects of the present disclosure. The UE 115-*b* may be included or be part of a personal computer (e.g., a laptop computer, a netbook computer, a tablet computer, etc.), a cellular telephone, a PDA, a DVR, an internet appliance, a gaming console, an e-reader, a vehicle, a home appliance, a lighting or alarm control system, etc. The UE 115-*b* may, in some examples, have an internal power supply (not shown), such as a small battery, to facilitate mobile operation. In some examples, the UE 115-*b* may be an example of aspects of one or more of the UEs 115 described with reference to FIG. 1, or aspects of the apparatus 505 or 705 described with reference to FIG. 5 or 7. The UE 115-*b* may be configured to implement at least some of the UE or apparatus techniques and functions described with reference to FIG. 1, 2, 3, 4, 5, 6, 7, or 8.

The UE 115-*b* may include a processor 910, a memory 920, at least one transceiver (represented by transceiver(s) 930), at least one antenna (represented by antenna(s) 940), or a wireless communication manager 950. Each of these components may be in communication with each other, directly or indirectly, over one or more buses 935.

The memory 920 may include random access memory (RAM) or read-only memory (ROM). The memory 920 may store computer-readable, computer-executable code 925 containing instructions that are configured to, when executed, cause the processor 910 to perform various functions described herein related to wireless communication, including, for example, transmitting or receiving delayed feedback for a transmission when a transmitter is unable to transmit feedback at a default feedback transmission time. Alternatively, the computer-executable code 925 may not be directly executable by the processor 910 but be configured to cause the UE 115-*b* (e.g., when compiled and executed) to perform various of the functions described herein.

The processor 910 may include an intelligent hardware device, e.g., a central processing unit (CPU), a microcontroller, an ASIC, etc. The processor 910 may process information received through the transceiver(s) 930 or information to be sent to the transceiver(s) 930 for transmission through the antenna(s) 940. The processor 910 may handle, alone or in connection with the wireless communication manager 950, various aspects of communicating over (or managing communications over) one or more RF spectrum bands.

The transceiver(s) 930 may include a modem configured to modulate packets and provide the modulated packets to the antenna(s) 940 for transmission, and to demodulate packets received from the antenna(s) 940. The transceiver(s) 930 may, in some examples, be implemented as one or more transmitters and one or more separate receivers. The transceiver(s) 930 may support communications in one or more RF spectrum bands. The transceiver(s) 930 may be configured to communicate bi-directionally, via the antenna(s) 940, with one or more of the network access devices 105 described with reference to FIG. 1 or 2, or one or more of the apparatus 505 or 705 described with reference to FIG. 5 or 7. While the UE 115-*b* may include a single antenna, there may be examples in which the UE 115-*b* may include multiple antennas 940.

The wireless communication manager 950 may be configured to perform or control some or all of the UE or apparatus techniques or functions described with reference to FIG. 1, 2, 3, 4, 5, 6, 7, or 8 related to wireless communication over one or more RF spectrum bands. The wireless communication manager 950, or portions of it, may include a processor, or some or all of the functions of the wireless communication manager 950 may be performed by the processor 910 or in connection with the processor 910. In some examples, the wireless communication manager 950 may be an example of aspects of the wireless communication manager 120-*a*, 120-*b*, 520, 520-*a*, 720, or 720-*a* described with reference to FIG. 1, 5, 6, 7, or 8.

Figure 10:
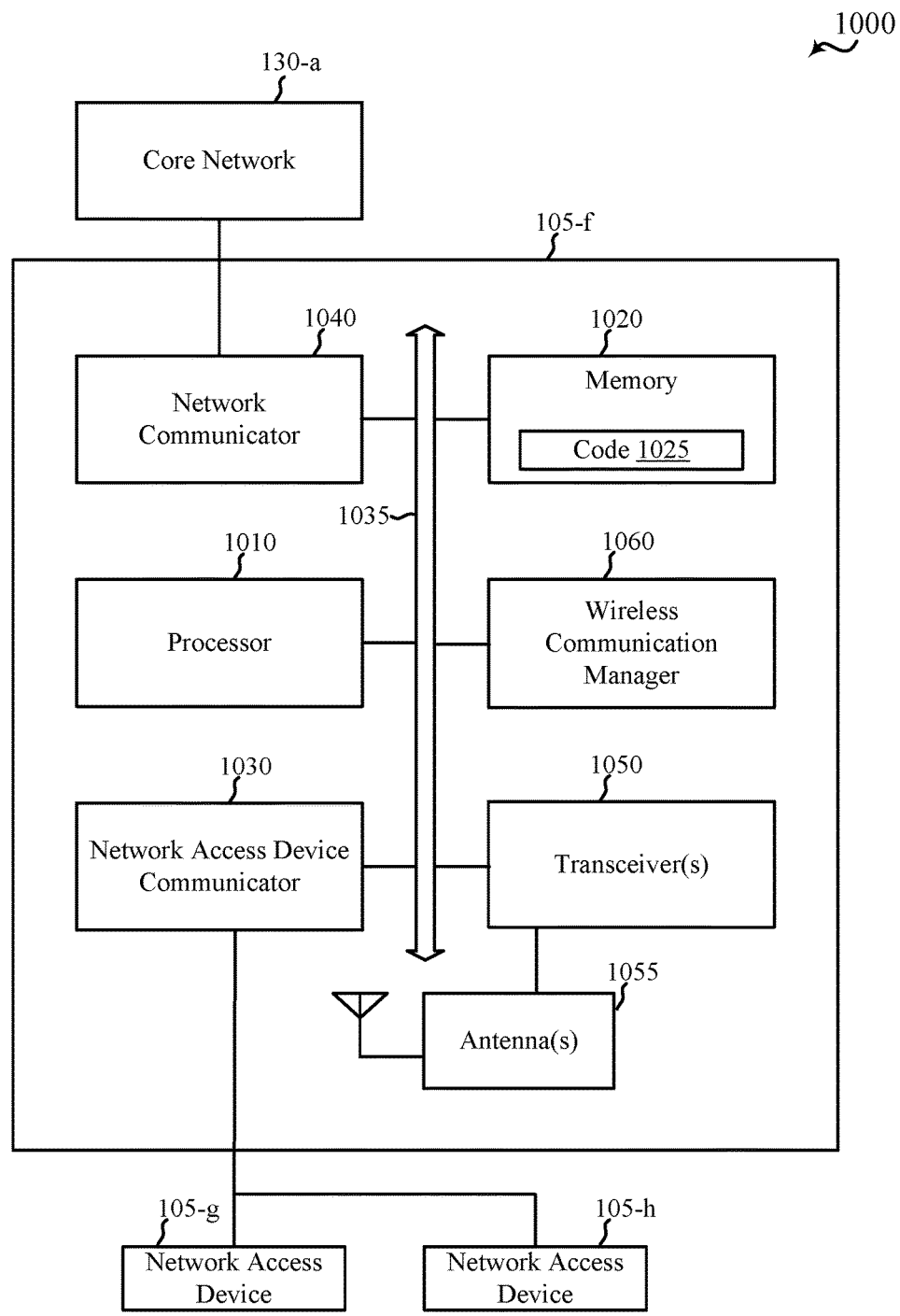
FIG. 10 shows a block diagram of a network access device for use in wireless communication, in accordance with one or more aspects of the present disclosure.

FIG. 10 shows a block diagram 1000 of a network access device 105-*f* for use in wireless communication, in accordance with one or more aspects of the present disclosure. In some examples, the network access device 105-*f* may be an example of one or more aspects of a network access device 105 (e.g., an eNB, an ANC, a RH, or a base station) described with reference to FIG. 1 or 2, or aspects of the apparatus 505 or 705 described with reference to FIG. 5 or 7. The network access device 105-*f* may be configured to implement or facilitate at least some of the network access device techniques and functions described with reference to FIG. 1, 2, 3, 4, 5, 6, 7, or 8.

The network access device 105-*f* may include a processor 1010, a memory 1020, at least one transceiver (represented by transceiver(s) 1050), at least one antenna (represented by base station antenna(s) 1055), or a wireless communication manager 1060. The network access device 105-*f* may also include one or more of a network access device communicator 1030 or a network communicator 1040. Each of these components may be in communication with each other, directly or indirectly, over one or more buses 1035.

The memory 1020 may include RAM or ROM. The memory 1020 may store computer-readable, computer-executable code 1025 containing instructions that are configured to, when executed, cause the processor 1010 to perform various functions described herein related to wireless communication, including, for example, transmitting or receiving delayed feedback for a transmission when a transmitter is unable to transmit feedback at a default feedback transmission time. Alternatively, the computer-executable code 1025 may not be directly executable by the processor 1010 but be configured to cause the network access device 105-*f* (e.g., when compiled and executed) to perform various of the functions described herein.

The processor 1010 may include an intelligent hardware device, e.g., a CPU, a microcontroller, an ASIC, etc. The processor 1010 may process information received through the transceiver(s) 1050, the network access device communicator 1030, or the network communicator 1040. The processor 1010 may also process information to be sent to the transceiver(s) 1050 for transmission through the antenna(s) 1055, to the network access device communicator 1030, for transmission to one or more other network access devices (e.g., network access device 105-*g* and network access device 105-*h*), or to the network communicator 1040 for transmission to a core network 130-*a*, which may be an example of one or more aspects of the core network 130 described with reference to FIG. 1. The processor 1010 may handle, alone or in connection with the wireless communication manager 1060, various aspects of communicating over (or managing communications over) one or more RF spectrum bands.

The transceiver(s) 1050 may include a modem configured to modulate packets and provide the modulated packets to the antenna(s) 1055 for transmission, and to demodulate packets received from the antenna(s) 1055. The transceiver(s) 1050 may, in some examples, be implemented as one or more transmitters and one or more separate receivers. The transceiver(s) 1050 may support communications in one or more RF spectrum bands. The transceiver(s) 1050 may be configured to communicate bi-directionally, via the antenna(s) 1055, with one or more UEs or apparatuses, such as one or more of the UEs 115 described with reference to FIG. 1 or 9, or one or more of the apparatus 505 or 705 described with reference to FIG. 5 or 7. The network access device 105-*f* may, for example, include multiple antennas 1055 (e.g., an antenna array). The network access device 105-*f* may communicate with the core network 130-*a* through the network communicator 1040. The network access device 105-*f* may also communicate with other network access devices, such as the network access device 105-*g* and the network access device 105-*h*, using the network access device communicator 1030.

The wireless communication manager 1060 may be configured to perform or control some or all of the techniques or functions described with reference to FIG. 1, 2, 3, 4, 5, 6, 7, or 8 related to wireless communication over one or more RF spectrum bands. The wireless communication manager 1060, or portions of it, may include a processor, or some or all of the functions of the wireless communication manager 1060 may be performed by the processor 1010 or in connection with the processor 1010. In some examples, the wireless communication manager 1060 may be an example of aspects of the wireless communication manager 120-*a*, 120-*b*, 520, 520-*a*, 720, or 720-*a* described with reference to FIG. 1, 5, 6, 7, or 8.

Figure 11:
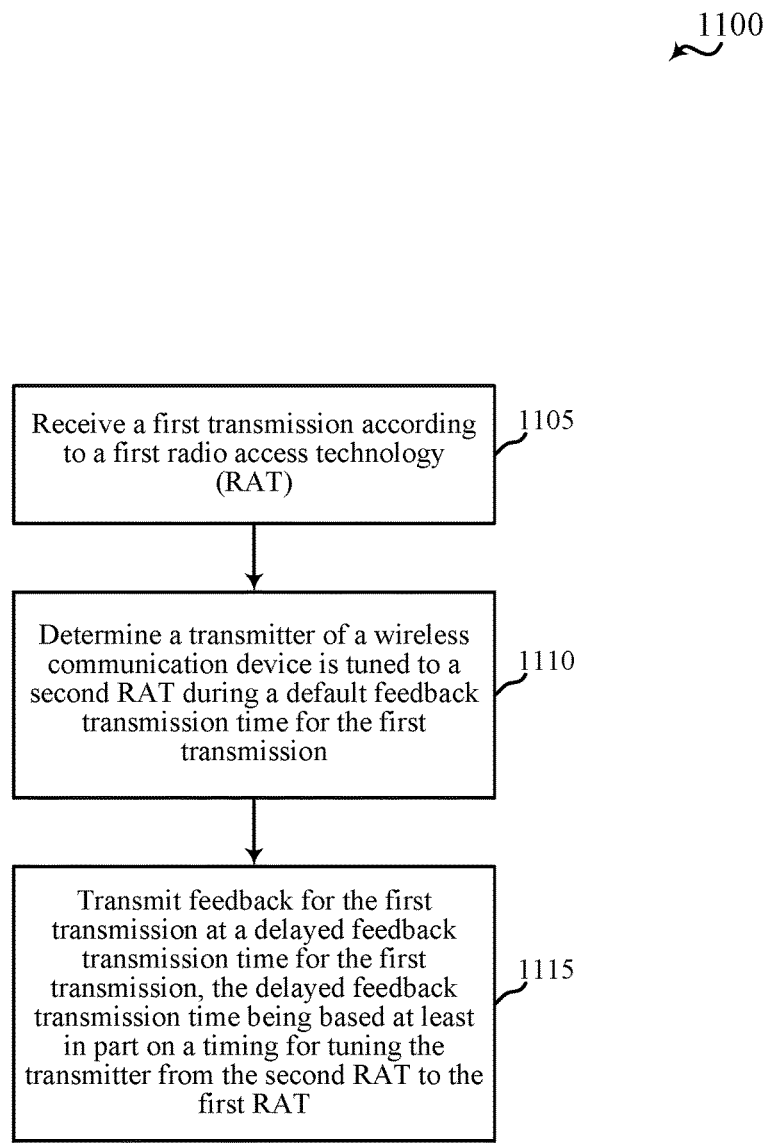
FIG. 11 is a flow chart illustrating an example of a method for wireless communication at a wireless communication device, in accordance with one or more aspects of the present disclosure.

FIG. 11 is a flow chart illustrating an example of a method 1100 for wireless communication at a wireless communication device, in accordance with one or more aspects of the present disclosure. For clarity, the method 1100 is described below with reference to aspects of one or more of the UEs 115 described with reference to FIG. 1, 2, or 9, aspects of one or more of the network access devices 105 (e.g., an eNB, an ANC, a RH, or a base station) described with reference to FIG. 1, 2, or 10, aspects of the apparatus 505 described with reference to FIG. 5, or aspects of the wireless communication manager 120-*a*, 120-*b*, 520, 520-*a*, 950, or 1060 described with reference to FIG. 1, 5, 6, 9, or 10. In some examples, a wireless communication device may execute one or more sets of codes to control the functional elements of the wireless communication device to perform the functions described below. Additionally or alternatively, the wireless communication device may perform one or more of the functions described below using special-purpose hardware.

At 1105, the method 1100 may include receiving a first transmission according to a first RAT. In some examples, the first transmission may be received during a first TTI. The operation(s) at 1105 may be performed using the wireless communication manager 120-*a*, 120-*b*, 520, 520-*a*, 950, or 1060 described with reference to FIG. 1, 5, 6, 9, or 10, or the transmission reception manager 535 described with reference to FIG. 5 or 6.

At 1110, the method 1100 may include determining a transmitter of the wireless communication device is tuned to a second RAT during a default feedback transmission time for the first transmission. In some examples, the default feedback transmission time may be during the first TTI. In other examples, the default feedback transmission time may be during a TTI other than the first TTI. The operation(s) at 1110 may be performed using the wireless communication manager 120-*a*, 120-*b*, 520, 520-*a*, 950, or 1060 described with reference to FIG. 1, 5, 6, 9, or 10, or the feedback transmission manager 540 or transmitter availability determiner 545 described with reference to FIG. 5 or 6.

At 1115, the method 1100 may include transmitting feedback for the first transmission at a delayed feedback transmission time for the first transmission. The delayed feedback transmission time may be based on a timing for tuning the transmitter from the second RAT to the first RAT. In some examples, the delayed feedback transmission time may be during a second TTI. In some examples, the feedback for the first transmission may include a HARQ ACK or a HARQ NACK. In some examples, the feedback for the first transmission may be transmitted in a control channel or a data channel (e.g., within a MAC PDU (along with data (if any))). In some examples, the delayed feedback transmission time may be synchronized between a UE (e.g., UEs 115) and one or more network devices (e.g., eNBs 105-*a*, ANCs 105-*b*, and/or RHs 105-*c*). In some examples, the operation(s) at 1115 may include transmitting, with the feedback for the first transmission, delayed feedback for at least a second transmission according to the first RAT. The operation(s) at 1115 may be performed using the wireless communication manager 120-*a*, 120-*b*, 520, 520-*a*, 950, or 1060 described with reference to FIG. 1, 5, 6, 9, or 10, or the feedback transmission manager 540 or delayed feedback transmission manager 550 described with reference to FIG. 5 or 6.

Figure 12:
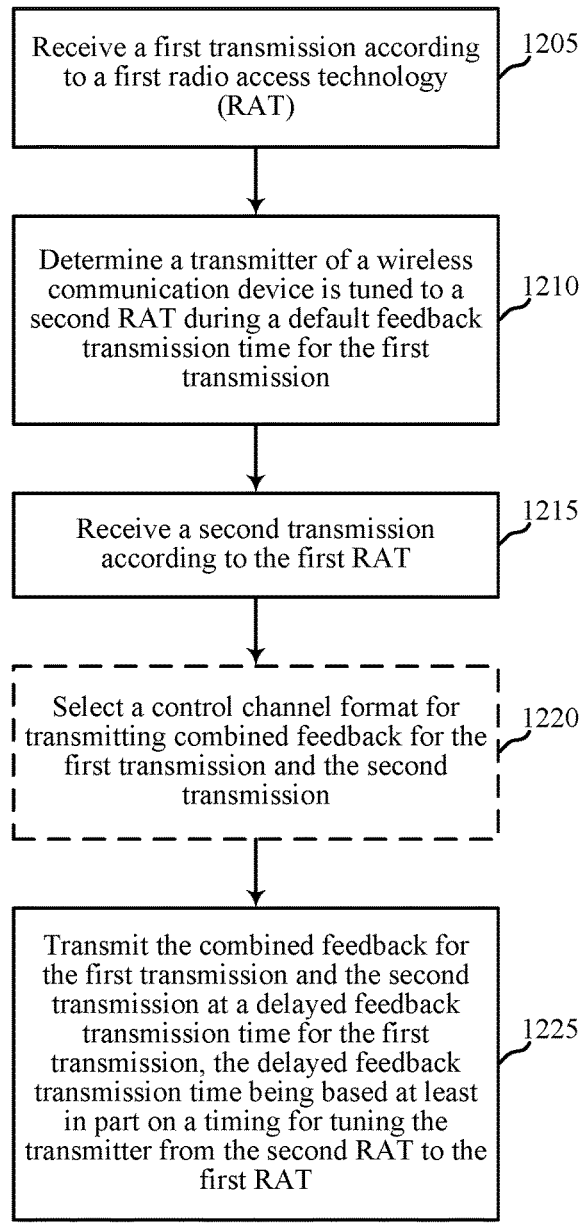
FIG. 12 is a flow chart illustrating an example of a method for wireless communication at a wireless communication device, in accordance with one or more aspects of the present disclosure.

FIG. 12 is a flow chart illustrating an example of a method 1200 for wireless communication at a wireless communication device, in accordance with one or more aspects of the present disclosure. For clarity, the method 1200 is described below with reference to aspects of one or more of the UEs 115 described with reference to FIG. 1, 2, or 9, aspects of one or more of the network access devices 105 (e.g., an eNB, an ANC, a RH, or a base station) described with reference to FIG. 1, 2, or 10, aspects of the apparatus 505 described with reference to FIG. 5, or aspects of the wireless communication manager 120-*a*, 120-*b*, 520, 520-*a*, 950, or 1060 described with reference to FIG. 1, 5, 6, 9, or 10. In some examples, a wireless communication device may execute one or more sets of codes to control the functional elements of the wireless communication device to perform the functions described below. Additionally or alternatively, the wireless communication device may perform one or more of the functions described below using special-purpose hardware.

At 1205, the method 1200 may include receiving a first transmission according to a first RAT. In some examples, the first transmission may be received during a first TTI. The operation(s) at 1205 may be performed using the wireless communication manager 120-*a*, 120-*b*, 520, 520-*a*, 950, or 1060 described with reference to FIG. 1, 5, 6, 9, or 10, or the transmission reception manager 535 described with reference to FIG. 5 or 6.

At 1210, the method 1200 may include determining a transmitter of the wireless communication device is tuned to a second RAT during a default feedback transmission time for the first transmission. In some examples, the default feedback transmission time may be during the first TTI. In other examples, the default feedback transmission time may be during a TTI other than the first TTI. The operation(s) at 1210 may be performed using the wireless communication manager 120-*a*, 120-*b*, 520, 520-*a*, 950, or 1060 described with reference to FIG. 1, 5, 6, 9, or 10, or the feedback transmission manager 540 or transmitter availability determiner 545 described with reference to FIG. 5 or 6.

At 1215, the method 1200 may include receiving a second transmission according to the first RAT. In some examples, the second transmission may be received during a second TTI. The second transmission may be associated with a second default feedback transmission time during the second TTI (or during a TTI other than the second TTI). The operation(s) at 1215 may be performed using the wireless communication manager 120-*a*, 120-*b*, 520, 520-*a*, 950, or 1060 described with reference to FIG. 1, 5, 6, 9, or 10, or the transmission reception manager 535 described with reference to FIG. 5 or 6.

At 1220, the method 1200 may optionally include selecting a control channel format for transmitting combined feedback for the first transmission and the second transmission. The control channel format may be indicative of the combined feedback, and in some examples may be selected from a plurality of control channel formats. In some examples, the plurality of control channel formats may be associated with: different scrambling sequences, or different encoding schemes, or different identifiers, or different combinations thereof. The operation(s) at 1220 may be performed using the wireless communication manager 120-*a*, 120-*b*, 520, 520-*a*, 950, or 1060 described with reference to FIG. 1, 5, 6, 9, or 10, the feedback transmission manager 540 or delayed feedback transmission manager 550 described with reference to FIG. 5 or 6, or the control channel format selector 605 described with reference to FIG. 6.

At 1225, the method 1200 may include transmitting the combined feedback for the first transmission and the second transmission at a delayed feedback transmission time for the first transmission. The delayed feedback transmission time may be based on a timing for tuning the transmitter from the second RAT to the first RAT. In some examples, the delayed feedback transmission time may be during the second TTI. In some examples, the combined feedback for the first transmission and the second transmission may include a HARQ ACK or a HARQ NACK. In some examples, the combined feedback for the first transmission and the second transmission may be transmitted in a control channel (e.g., based on a selected control channel format) or a data channel (e.g., within a MAC PDU (along with data (if any))). The operation(s) at 1225 may be performed using the wireless communication manager 120-*a*, 120-*b*, 520, 520-*a*, 950, or 1060 described with reference to FIG. 1, 5, 6, 9, or 10, the feedback transmission manager 540 or delayed feedback transmission manager 550 described with reference to FIG. 5 or 6, or the feedback combiner 610 described with reference to FIG. 6.

In some examples, the combined feedback transmitted at 1225 may include feedback for more than the first transmission and the second transmission.

Figure 13:
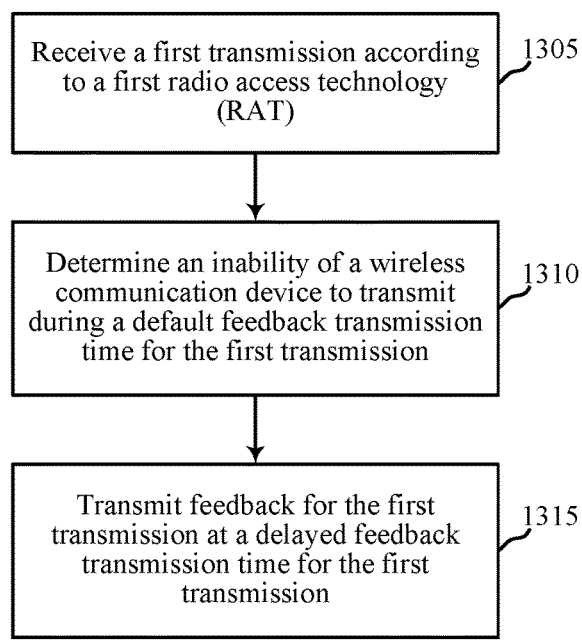
FIG. 13 is a flow chart illustrating an example of a method for wireless communication at a wireless communication device, in accordance with one or more aspects of the present disclosure.

FIG. 13 is a flow chart illustrating an example of a method 1300 for wireless communication at a wireless communication device, in accordance with one or more aspects of the present disclosure. For clarity, the method 1300 is described below with reference to aspects of one or more of the UEs 115 described with reference to FIG. 1, 2, or 9, aspects of one or more of the network access devices 105 (e.g., an eNB, an ANC, a RH, or a base station) described with reference to FIG. 1, 2, or 10, aspects of the apparatus 505 described with reference to FIG. 5, or aspects of the wireless communication manager 120-*a*, 120-*b*, 520, 520-*a*, 950, or 1060 described with reference to FIG. 1, 5, 6, 9, or 10. In some examples, a wireless communication device may execute one or more sets of codes to control the functional elements of the wireless communication device to perform the functions described below. Additionally or alternatively, the wireless communication device may perform one or more of the functions described below using special-purpose hardware.

At 1305, the method 1300 may include receiving a first transmission according to a first RAT. In some examples, the first transmission may be received during a first TTI. The operation(s) at 1305 may be performed using the wireless communication manager 120-*a*, 120-*b*, 520, 520-*a*, 950, or 1060 described with reference to FIG. 1, 5, 6, 9, or 10, or the transmission reception manager 535 described with reference to FIG. 5 or 6.

At 1310, the method 1300 may include determining an inability of the wireless communication device to transmit based on the first RAT during a default feedback transmission time for the first transmission. In some examples, the default feedback transmission time may be during the first TTI. In other examples, the default feedback transmission time may be during a TTI other than the first TTI. The operation(s) at 1310 may be performed using the wireless communication manager 120-*a*, 120-*b*, 520, 520-*a*, 950, or 1060 described with reference to FIG. 1, 5, 6, 9, or 10, or the feedback transmission manager 540 or transmitter availability determiner 545 described with reference to FIG. 5 or 6.

At 1315, the method 1300 may include transmitting feedback for the first transmission at a delayed feedback transmission time for the first transmission. In some examples, the delayed feedback transmission time may be during a second TTI. In some examples, the feedback for the first transmission may include a HARQ ACK or a HARQ NACK. In some examples, the feedback for the first transmission may be transmitted in a control channel or a data channel (e.g., within a MAC PDU (along with data (if any))). In some examples, the operation(s) at 1315 may include transmitting, with the feedback for the first transmission, delayed feedback for at least a second transmission according to the first RAT. The operation(s) at 1315 may be performed using the wireless communication manager 120-*a*, 120-*b*, 520, 520-*a*, 950, or 1060 described with reference to FIG. 1, 5, 6, 9, or 10, or the feedback transmission manager 540 or delayed feedback transmission manager 550 described with reference to FIG. 5 or 6.

In some examples, aspects of the methods 1100, 1200, and 1300 described with reference to FIGS. 11, 12, and 13 may be combined.

Figure 14:
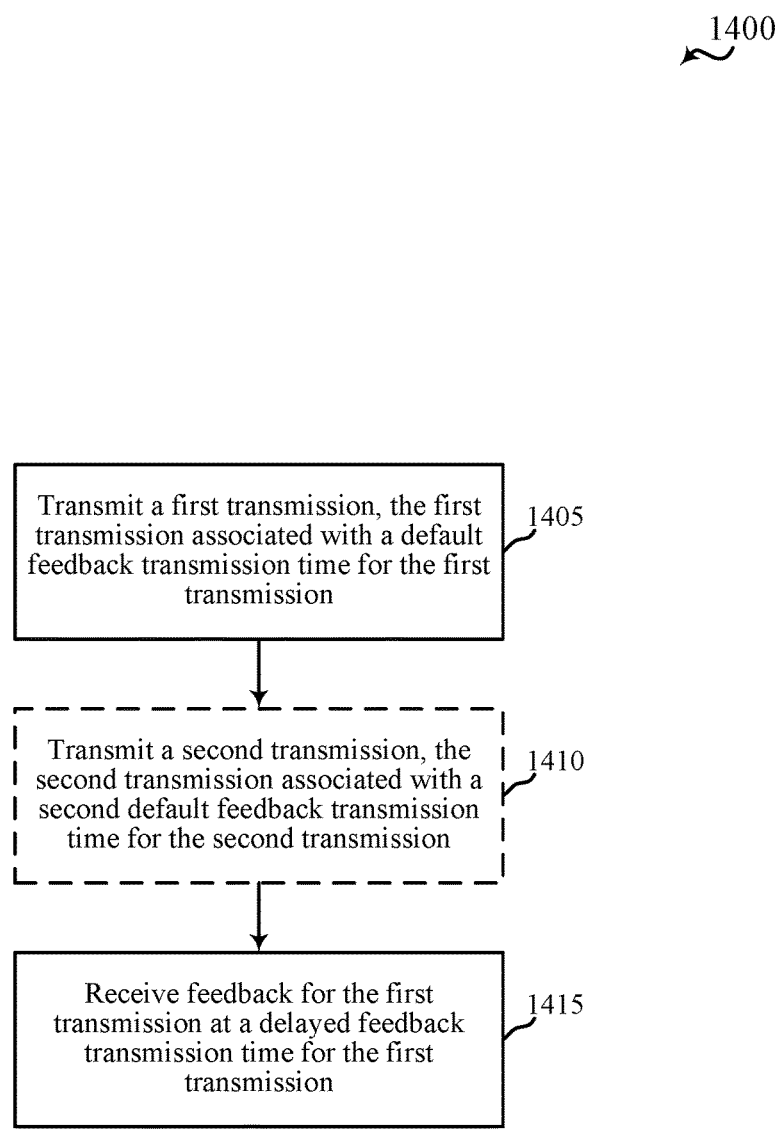
FIG. 14 is a flow chart illustrating an example of a method for wireless communication at a wireless communication device, in accordance with one or more aspects of the present disclosure.

FIG. 14 is a flow chart illustrating an example of a method 1400 for wireless communication at a wireless communication device, in accordance with one or more aspects of the present disclosure. For clarity, the method 1400 is described below with reference to aspects of one or more of the UEs 115 described with reference to FIG. 1, 2, or 9, aspects of one or more of the network access devices 105 (e.g., an eNB, an ANC, a RH, or a base station) described with reference to FIG. 1, 2, or 10, aspects of the apparatus 705 described with reference to FIG. 7, or aspects of the wireless communication manager 120-*a*, 120-*b*, 720, 720-*a*, 950, or 1060 described with reference to FIG. 1, 7, 8, 9, or 10. In some examples, a wireless communication device may execute one or more sets of codes to control the functional elements of the wireless communication device to perform the functions described below. Additionally or alternatively, the wireless communication device may perform one or more of the functions described below using special-purpose hardware.

At 1405, the method 1400 may include transmitting a first transmission according to a first RAT. In some examples, the first transmission may be transmitted during a first TTI. The first transmission may be associated with a default feedback transmission time for the first transmission. In some examples, the default feedback transmission time may be during the first TTI. In other examples, the default feedback transmission time may be during a TTI other than the first TTI. The operation(s) at 1405 may be performed using the wireless communication manager 120-*a*, 120-*b*, 720, 720-*a*, 950, or 1060 described with reference to FIG. 1, 7, 8, 9, or 10, or the transmission manager 735 described with reference to FIG. 7 or 8.

At 1410, the method 1400 may optionally include transmitting a second transmission according to the first RAT. In some examples, the second transmission may be transmitted during a second TTI. The second transmission may be associated with a second default feedback transmission time for the second transmission. In some examples, the second default feedback transmission time may be during the second TTI (or during a TTI other than the second TTI). The operation(s) at 1410 may be performed using the wireless communication manager 120-*a*, 120-*b*, 720, 720-*a*, 950, or 1060 described with reference to FIG. 1, 7, 8, 9, or 10, or the transmission manager 735 described with reference to FIG. 7 or 8.

At 1415, the method 1400 may include receiving feedback for the first transmission at a delayed feedback transmission time for the first transmission. In some examples, the delayed feedback transmission time may be during the second TTI. In some examples, the delayed feedback transmission time may be known to the wireless communication device prior to receiving the feedback for the first transmission (e.g., because the wireless communication device knows when a receiver of the first transmission is able and/or unable to transmit the feedback for the first transmission). In some examples, the feedback for the first transmission may include a HARQ ACK or a HARQ NACK. In some examples, the feedback for the first transmission may be received in a control channel or a data channel (e.g., within a MAC PDU (along with data (if any))). In some examples, the operation(s) at 1415 may include receiving, with the feedback for the first transmission, delayed feedback for at least a second transmission according to the first RAT. The operation(s) at 1415 may be performed using the wireless communication manager 120-*a*, 120-*b*, 720, 720-*a*, 950, or 1060 described with reference to FIG. 1, 7, 8, 9, or 10, or the feedback reception manager 740 described with reference to FIG. 7 or 8.

In some examples of the method 1400, the feedback for the first transmission may be received (e.g., at 1415) in combined feedback for the first transmission and the second transmission. The combined feedback may be received at the delayed feedback transmission time for the first transmission. In some examples, the combined feedback may be received according to a control channel format indicative of the combined feedback. In some examples, the control channel format may be one of a plurality of control channel formats. In some examples, the plurality of control channel formats may be associated with: different scrambling sequences, or different encoding schemes, or different identifiers, or different combinations thereof.

In some examples, combined feedback received at 1415 may include feedback for more than just the first transmission and the second transmission.

The methods 1100, 1200, 1300, and 1400 described with reference to FIGS. 11, 12, 13, and 14 may provide for wireless communication. It should be noted that the methods 1100, 1200, 1300, and 1400 are just example implementations, and the operations of the methods 1100, 1200, 1300, and 1400 may be rearranged or otherwise modified such that other implementations are possible.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method of wireless communication at a wireless communication device, comprising:
   receiving a first transmission according to a first radio access technology (RAT) during a first transmission time interval (TTI);
   determining a transmitter of the wireless communication device is tuned to a second RAT during a default feedback transmission time for the first transmission; and
   transmitting combined feedback for the first transmission and a second transmission at a delayed feedback transmission time for the first transmission, the delayed feedback transmission time based at least in part on a timing for tuning the transmitter from the second RAT to the first RAT, wherein the delayed feedback transmission time is during a second TTI.

2. The method of claim 1, wherein the combined feedback for the first transmission comprises:
   a hybrid automatic repeat request (HARQ) acknowledgement (ACK) or a HARQ non-acknowledgement (NACK).

3. The method of claim 1, further comprising:
   receiving the second transmission according to the first RAT, the second transmission associated with a second default feedback transmission time during the second TTI.

4. The method of claim 3, further comprising:
   selecting a control channel format for transmitting the combined feedback, the control channel format indicative of the combined feedback, and the control channel format selected from a plurality of control channel formats.

5. The method of claim 4, wherein the plurality of control channel formats are associated with:
   different scrambling sequences, or different encoding schemes, or different identifiers, or different combinations thereof.

6. The method of claim 1, wherein the default feedback transmission time is during the first TTI.

7. The method of claim 1, wherein the combined feedback for the first transmission is transmitted within a medium access control (MAC) protocol data unit (PDU).

8. The method of claim 1, further comprising:
   transmitting, with the combined feedback for the first transmission, delayed feedback for at least the second transmission according to the first RAT.

9. The method of claim 1, wherein the delayed feedback transmission time is synchronized between the wireless communication device and a network device.

10. An apparatus for wireless communication, comprising:
    a processor;
    memory in electronic communication with the processor; and the processor and memory configured to:
    receive a first transmission according to a first radio access technology (RAT) during a first transmission time interval (TTI);
    determine a transmitter of the apparatus is tuned to a second RAT during a default feedback transmission time for the first transmission; and
    transmit combined feedback for the first transmission and a second transmission at a delayed feedback transmission time for the first transmission, the delayed feedback transmission time based at least in part on a timing for tuning the transmitter from the second RAT to the first RAT, wherein the delayed feedback transmission time is during a second TTI.

11. The apparatus of claim 10, wherein the combined feedback for the first transmission comprises:
a hybrid automatic repeat request (HARQ) acknowledgement (ACK) or a HARQ non-acknowledgement (NACK).

12. The apparatus of claim 10, wherein the processor and the memory are further configured to:
receive the second transmission according to the first RAT, the second transmission associated with a second default feedback transmission time during the second TTI.

13. The apparatus of claim 12, wherein the processor and the memory are further configured to:
select a control channel format for transmitting the combined feedback, the control channel format indicative of the combined feedback, and the control channel format selected from a plurality of control channel formats.

14. A method of wireless communication at a wireless communication device, comprising:
transmitting a first transmission according to a first radio access technology (RAT) during a first transmission time interval (TTI), the first transmission associated with a default feedback transmission time for the first transmission; and
receiving combined feedback for the first transmission and a second transmission at a delayed feedback transmission time for the first transmission, wherein the delayed feedback transmission time is during a second TTI.

15. The method of claim 14, wherein the delayed feedback transmission time is known to the wireless communication device prior to receiving the feedback for the first transmission.

16. The method of claim 14, further comprising:
scheduling the delayed feedback transmission time based at least in part on a wireless communication device associated with the combined feedback being tuned to a second RAT.

17. The method of claim 14, wherein the combined feedback comprises:
a hybrid automatic repeat request (HARQ) acknowledgement (ACK) or a HARQ non-acknowledgement (NACK).

18. The method of claim 14, wherein the second transmission associated with a second default feedback transmission time during the second TTI.

19. The method of claim 14, wherein the combined feedback is received according to a control channel format indicative of the combined feedback, the control channel format one of a plurality of control channel formats.

20. The method of claim 19, wherein the plurality of control channel formats are associated with:
different scrambling sequences, or different encoding schemes, or different identifiers, or different combinations thereof.

21. The method of claim 14, wherein the default feedback transmission time is during the first TTI.

22. The method of claim 14, wherein the combined feedback for the first transmission is received within a medium access control (MAC) protocol data unit (PDU).

23. The method of claim 14, further comprising:
receiving, with the combined feedback for the first transmission, delayed feedback for at least the second transmission according to the first RAT.

24. An apparatus for wireless communication, comprising:
a processor;
memory in electronic communication with the processor; and the processor and memory configured to:
transmit a first transmission, the first transmission associated with a default feedback transmission time during a first transmission time interval (TTI) for the first transmission; and
receive combined feedback for the first transmission and a second transmission at a delayed feedback transmission time for the first transmission, wherein the delayed feedback transmission time is during a second TTI.

25. The apparatus of claim 24, wherein the delayed feedback transmission time is known to the apparatus prior to receiving the combined feedback for the first transmission.

26. The apparatus of claim 24, wherein the combined feedback comprises:
a hybrid automatic repeat request (HARQ) acknowledgement (ACK) or a HARQ non-acknowledgement (NACK).

* * * * *